(12) United States Patent
Dahlén

(10) Patent No.: US 9,112,902 B2
(45) Date of Patent: Aug. 18, 2015

(54) SERVICE SUBSCRIPTION ASSOCIATED WITH REAL TIME COMPOSITION OF SERVICES

(75) Inventor: Torbjörn Dahlén, Knivsta (SE)

(73) Assignee: Optis Wireless Technology, LLC, Plano, TX (US)

( * ) Notice: Subject to any disclaimer, the term of this patent is extended or adjusted under 35 U.S.C. 154(b) by 1952 days.

(21) Appl. No.: 11/983,866

(22) Filed: Nov. 13, 2007

(65) Prior Publication Data

US 2009/0125628 A1 May 14, 2009

(51) Int. Cl.
 *H04L 29/06* (2006.01)
 *G06F 15/16* (2006.01)
 *H04L 29/08* (2006.01)

(52) U.S. Cl.
 CPC ............... *H04L 67/16* (2013.01); *H04L 67/02* (2013.01); *H04L 65/1006* (2013.01)

(58) Field of Classification Search
 CPC .................................................. H04L 65/1006
 USPC ........................................................ 709/227
 See application file for complete search history.

(56) References Cited

U.S. PATENT DOCUMENTS

| | | | |
|---|---|---|---|
| 6,885,871 B2 | 4/2005 | Caloud | |
| 6,983,312 B1 | 1/2006 | O'Neil | |
| 7,058,068 B2 | 6/2006 | Gawargy et al. | |
| 7,418,485 B2 | 8/2008 | Payrits | |
| 7,453,997 B2 | 11/2008 | Miller et al. | |
| 7,568,224 B1 | 7/2009 | Jennings et al. | |
| 2003/0187992 A1 | 10/2003 | Steenfeldt et al. | |
| 2004/0186883 A1 | 9/2004 | Nyman et al. | |
| 2004/0215824 A1* | 10/2004 | Payrits | 709/245 |
| 2005/0071423 A1 | 3/2005 | Rajaniemi | |
| 2005/0198320 A1 | 9/2005 | Chou et al. | |
| 2005/0228984 A1 | 10/2005 | Edery et al. | |
| 2007/0223462 A1 | 9/2007 | Hite et al. | |
| 2008/0120705 A1 | 5/2008 | Beyer et al. | |
| 2008/0172486 A1* | 7/2008 | Danne et al. | 709/224 |

FOREIGN PATENT DOCUMENTS

WO 2009/008807 A1 1/2009

OTHER PUBLICATIONS

Deason, N., "SIP and SOAP"; draft-deason-sip-soap-00.txt., Internet Engineering Task Force, Internet Draft, Jun. 30, 2000; http://www.softarmor.com/wgdb/docs/draft-deason-sip-soap-00.txt, pp. 1-9.*

(Continued)

*Primary Examiner* — Suraj Joshi
(74) *Attorney, Agent, or Firm* — Vincent J. Allen; Stephen Y. Liu; Carstens & Cahoon, LLP

(57) ABSTRACT

Real-time service composition is provided by a Session Initiation Protocol (SIP) transport binding for Simple Object Access Protocol (SOAP) messages. A SOAPAction header and SOAP envelope can be included in a SIP message to identify a requested service. The SIP message recipient can parse out the SOAP envelope and forward same to a corresponding Web Service. An intermediary node, including a SIP Proxy, can evaluate incoming SIP/SOAP messages and provide requested services to which they have access. Service discovery and subscription are facilitated by adding Universal Description, Discovery and Integration (UDDI) services requests and responses.

4 Claims, 13 Drawing Sheets

(56) References Cited

OTHER PUBLICATIONS

"WSDL Service Interface for UDDI Publication API V2.0", 2000-2002; http://www.uddi.org/wsdl/publish_v2.wsdl, pp. 1-4.*
Clement, L., et al., "UDDI Version 3.0.2", UDDI Spec Technical Committee Draft, Oct. 19, 2004; http://www.uddi.org/pubs/uddi_v3.htm, Sections 1-N.*
Box, D., et al., "Simple Object Access Protocol (SOAP) 1.1", W3C Note May 8, 2000; http://www.w3.org/TR/2000/NOTE-SOAP-20000508/, Sections 1-A.2.*
Liu, F., et al., "WSIP—Web Service SIP Endpoint for Converged Multimedia/Multimodal Communication over IP," Proceedings of the IEEE International Conference on Web Services (ICWS'04), 2004, pp. 1-8.
Office Action mailed Dec. 21, 2007 from Swedish Patent Office for Swedish Application No. 0701714-8.
Deason, N., "SIP and SOAP," Internet Engineering Task Force, Internet Draft, Jun. 30, 2000, http://www.softarmor.com/wgdb/docs/draft-deason-sip-soap-00.txt, pp. 1-9.
Box, D., et al., "Simple Object Access Protocol (SOAP) 1.1, W3C Note May 8, 2000," W3C, http://www.w3.org/TR/2000/NOTE-SOAP-20000508/, pp. 1-33.
Gudgin, M., et al., "SOAP Version 1.2, W3C Working Draft Jul. 9, 2001," W3C, http://www.w3.org/TR/2001/WD-soap12-20010709, pp. 1-48.
Rosenberg, J., "Identification of Communications Services in the Session Initiation Protocol (SIP)," IETF, May 7, 2007, http://tools.ietf.org/html/draft-rosenberg-sipping-service-identification-02, pp. 1-18.
Rosenberg, J., et al., "Caller Preferences for the Session Initiation Protocol (SIP), RFC 3841," Aug. 2004, ftp://ftp.rfc-editor.org/in-notes/rfc3841.txt, pp. 1-24.
Berners-Lee, T., et al., "Uniform Resource Identifiers (URI): Generic Syntax, RFC 2396," IETF, Aug. 1998, http://www.ietf.org/rfc/rfc2396.txt, pp. 1-36.
Moats, R., "RFC 2141-URN Syntax," May 1997, http://www.faqs.org/rfcs/rfc2141.html, pp. 1-6.
PCT International Search Report, mailed Feb. 23, 2009, in connection with International Application No. PCT/SE2008/050985.
PCT Written Opinion, mailed Feb. 23, 2009, in connection with International Application No. PCT/SE2008/050985.
Deason, N.: "SIP and SOAP"; draft-deason-sip-soap-00.txt, Internet Engineering Task Force, Internet Draft, Jun. 30, 2000; retrieved from http://www.softarmor.com/wgdb/docs/draft-deason-sip-soap-00.txt.
Box, D. et al: "Simple Object Access Protocol (SOAP) 1.1", W3C Note May 8, 2000; retrieved from: http://www.w3.org/TR/2000/NOTE-SOAP-20000508.
Clement, L. et al.: "UDDI Version 3.0.2", UDDI Spec Technical Committee Draft, Oct. 19, 2004; retrieved from: http://www.uddi.org/pubs/uddi_v3.htm.
Nanjundaswamy, V.K.: "Novell Nsure UDDI Server Architecture", Mar. 29, 2004, retrieved from: ftp://ftp.novell.hu/pub/mirrors/ftp.novell.com/forge/uddi/docs/Nsure%20UDDI%20OS%20Arch.pdf.
Sheng, Q. Z. et al.: "Discovering E-Services Using UDDI in SELF-SERV", in Proc. of the International Conference on E-Business (ICEB 2002); retrieved from http://soc.web.cse.unsw.edu.au/papers/iceb2002.pdf.
Gudgin, M. et al., "SOAP Version 1.2 Part 1: Messaging Framework", Internet Citation, XP002318628.
Gudgin, M. et al., "Soap Version 1.2 Part 2: Adjuncts", Internet Citation, XP002335585.
Almar, I. et al., "Sending SOAP over SIP", IETF Mailing Archive, May 14, 2002, pp. 1-3, XP002514932.
Dorgham, S.(ed.), "Next-Gen Open Service Solutions over IP (N-GOSSIP)—Area for SIP Enhancements", Internet Citation, XP002235858.
Mitra, N. et al., "SOAP Version 1.2 Part 0: Primer (Second Edition)" W3C Recommendation, Apr. 27, 2007, pp. 1-59, XP002514933.
Walsh, A. E. (ed.), "UDDI, SOAP and WSDL: The Web Services Specification Reference Book", pp. 18-25, 179, XP002495018.
Mitra, N., et al., "SOAP Version 1.2 Part 0: Primer (Second Edition), W3C Recommendation Apr. 27, 2007," W3C, http://www.w3.org/TR/soap12-part0/, pp. 1-47.
Chinnici, R., et al., "Web Services Description Language (WSDL) Version 2.0 Part 1: Core Language, W3C Working Draft 3, Aug. 2004," W3C, http://www.w3.org/TR/2004/WD-wsdl20-20040803/, pp. 1-72.
Rosenberg, J., et al., "SIP: Session Initiation Protocol, RFC 3261," IETF 2002, http://tools.ietf.org/html/rfc3261, pp. 1-336.
Clement, L., et al., "UDDI Version 3.0.2 UDDI Spec Technical Committee Draft, Dated Oct. 19, 2004," OASIS, http://uddi.org/pubs/uddi_v3.htm, pp. 1-370.
Office Action issued on Sep. 15, 2009 in corresponding U.S. Appl. No. 11/827,498.
US Office Action issued on Mar. 17, 2010 in corresponding U.S. Appl. No. 11/827,498.
US Office Action issued on Jul. 13, 2009 in corresponding U.S. Appl. No. 11/975,942.

* cited by examiner

SERVICE SUBSCRIPTION ASSOCIATED WITH REAL TIME COMPOSITION OF SERVICES

RELATED APPLICATION

This application is related to U.S. patent application Ser. No. 11/827,498, filed on Jul. 12, 2007, entitled "Real Time Composition of Services", to Torbjörn Dahléen, the disclosure of which is incorporated here by reference.

TECHNICAL FIELD

The present invention relates generally to communications and in particular to methods, devices and systems for providing real-time composition of services in communications systems.

BACKGROUND

Communication systems continue to grow and evolve. Convergence between different types of communication systems, e.g., Internet Protocol (IP), connection-based voice communications, and the like, is advancing rapidly. Recently the phrase "Next Generation Network" (NGN) has been used to describe various activities associated with this evolution. As defined by the International Telecommunications Union (ITU), an NGN is a packet-based network able to provide services (including telecommunication services) and able to make use of multiple broadband, QoS-enabled transport technologies and in which service-related functions are independent from underlying transport-related technologies. NGNs will also likely offer unrestricted access by users to different service providers and will support generalized mobility, which in turn will provide for consistent service provision to end users.

So called "Web Services" are another feature which may become commonplace in NGNs. Web Services provide, for example, a mechanism for interoperability between software entities which reside on different infrastructures and which may be operated by different companies. Web Services are typically defined as providing distributed services using, e.g., the standards suite Web Services Description Language (WSDL), Simple Object Access Protocol (SOAP) and Universal Description, Discovery and Integration (UDDI). For the interested reader, a description of WDSL can be found online as "Web Services Description Language (WSDL) Version 2.0 Part 1: Core Language, W3C Working Draft 3, Aug. 2004" at http://www.w4.org/TR/2004/WD-wsdl120-20040803/, the disclosure of which is incorporated here by reference. Similarly, a description of SOAP can be found online as "SOAP Version 1.2 Part 0: Primer (Second Edition), W3C Recommendation 27 Apr. 2007" at http://www.w3.org/TR/soap12-part0/, the disclosure of which is incorporated by reference. Additionally, for UDDI, a standards document entitled "UDDI Version 3.0.2 UDDI Spec Technical Committee Draft, Dated Oct. 19, 2004" can be found at http://uddi.org/pubs/uddi_v3.htm, the disclosure of which is incorporated here by reference.

Web Services can be characterized as a technology for exposing application functionality as services to software clients or to server applications. Among other things, Web Services allow for rapid creation of new services by combining existing functionality in new ways. This process is often referred to as composition or orchestration. Typically, Web Services are accessed with XML-encoded SOAP messages using hyper-text transfer protocol (HTTP) as a bearer. However, HTTP is designed for transaction based client/server request patterns where real time properties are not required. Consider in this regard the variable, and sometimes extensive, delays which can occur when a user retrieves a web page by clicking on an HTTP hyperlink. With the increasing demand for service interaction and rapid composition from the users of peer to peer, real-time communication services, there is a need to also apply the Web Services paradigm to this real-time domain.

Moreover, such efforts also do not take explicit intermediary addressing into consideration. On the contrary, existing work either considers SIP service addressing to be applicable for application launch only, e.g., by letting the application use a second protocol (e.g., HTTP) to perform actual method invocation, or is basing service addressing on SIP routing only, which provides a crude way of involving intermediary services into the session initiation sequence. This makes existing SIP service addressing based on capabilities ill-equipped to implement real-time service composition. Additionally, once available, it would be desirable to provide techniques and mechanisms for allowing users to discover and/or subscribe to such real-time services.

Accordingly, it would be desirable to address this need by providing service subscription techniques associated with real-time composition of services in communications systems.

SUMMARY

According to an exemplary embodiment, a service subscription method includes the step of: transmitting a Session Initiation Protocol (SIP) message including a Simple Object Access Protocol (SOAP) envelope and a SOAP action header, the SOAP action header indicating that the SIP message includes a Universal Description, Discovery and Integration (UDDI) service subscription request.

According to another exemplary embodiment, a computer-readable medium contains instructions which, when executed on a processor, perform the step of: transmitting a Session Initiation Protocol (SIP) message including a Simple Object Access Protocol (SOAP) envelope and a SOAP action header, the SOAP action header indicating that the SIP message includes a Universal Description, Discovery and Integration (UDDI) service subscription request.

According to still another exemplary embodiment, a communications node includes a processor operating as at least one of: a SIP user agent server (UAS) and an Event Service, and which receives a first SIP message including a Simple Object Access Protocol (SOAP) envelope and a SOAP action header indicating that the SIP message includes a Universal Description, Discovery and Integration (UDDI) service subscription request, wherein the processor sends, responsive to the first SIP message, a second SIP message toward an ultimate receiver of the UDDI service subscription request.

According to yet another exemplary embodiment, a communications node includes a processor operating as a watcher and as a SIP user agent server (UAS), which transmits a SIP message including a Simple Object Access Protocol (SOAP) envelope and a SOAP action header indicating that the SIP message includes a Universal Description, Discovery and Integration (UDDI) service subscription request.

BRIEF DESCRIPTION OF THE DRAWINGS

The accompanying drawings illustrate exemplary embodiments, wherein.

DETAILED DESCRIPTION

Figure 1A:
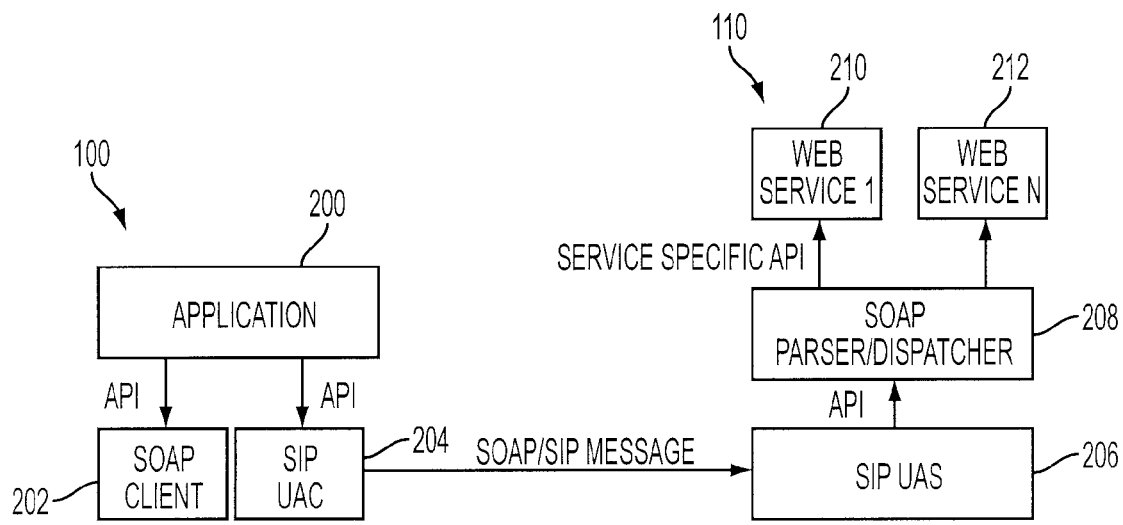
FIG. 1(a) depicts transmission of SIP message including a SOAP payload according to an exemplary embodiment.

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

According to exemplary embodiments described in the above-identified, related application, a solution to the need for real-time composition of services is provided by a Session Initiation Protocol (SIP) transport binding for SOAP messages. SIP signaling is described, for example, in the standards document entitled "Session Initiation Protocol, RFC 3261, authored by Rosenberg et. al., IETF 2002", which is available online at http://tools.ietf.org/html/rfc3261, and the disclosure of which is incorporated here by reference. As stated therein, SIP provides an application-layer control (signaling) protocol for creating, modifying, and terminating sessions with one or more participants. These sessions include, for example, Internet telephone calls, multimedia distribution, and multimedia conferences. SIP invitations are used to create sessions and to carry session descriptions that allow participants to agree on a set of compatible media types. "Proxy servers" are used in SIP environments to help route requests to the user's current location, authenticate and authorize users for services, implement provider call-routing policies, and provide features to users. Of particular interest for the present application, SIP provides real-time services through the use of timers which ensure minimal transaction delays.

SIP service requests can be characterized as, for example, either (1) a request to launch an application, e.g., a request to play a chess game, or (2) a request for some data to be provided or some transaction to be performed as a part of a more complex interaction. The service addressing needed differs depending on which of these two cases are being considered. For the former case (1), referred to herein as the "application launching case", SIP is used to locate and provide parameters to match the request to an application that can be launched, e.g., a multimedia telephony application, a chat application, a chess application, etc. In this case the launched application will then take over application specific signaling using in-session SIP signaling or some other protocol. Thus the need for precise service identification and/or the provision of service parameters is generally non-existent or at least very limited to support SIP service requests involving the launching of applications. Instead, for such SIP requests, the identification of service capabilities is more significant.

The second case (2), which is referred to herein as the "business method integration case", involves accessing services by a composition of complex functions from a number of more or less independent participating functions, e.g., publishing a Line Status Notification as a SIP session is being set up. This business method integration case applies, for example, whenever a user wants or needs to request a specific service (as opposed to requesting any service which provides certain capabilities) in the network or whenever input parameters are necessary to perform the service. Thus, in the business method integration case, as opposed to the application launching case, the ability to precisely identify a requested service and/or provide service parameters is important while the ability to specify a requested capability is less important. Exemplary embodiments of the present invention seek to facilitate the business method integration case. However, SIP service addressing is generally considered to be applicable for application launch only, thereby requiring an application which is launched using SIP to use a second protocol (e.g., HTTP) to perform the business method invocation. This makes existing SIP service addressing based on capabilities ineffective, by itself, for real-time service composition.

Accordingly, these exemplary embodiments provide a SIP transport binding for SOAP messages, i.e., exemplary techniques for transporting SOAP messages between SOAP nodes using SIP as a bearer. A real world example of a business integration case will provide an example of the utility of such a transport binding. Suppose, for example, that a TV channel is associated with a telephone number for charity calls to one of the shows that is being broadcast, e.g., on an IPTV multicast session. As Alice calls the TV channel, e.g., by using a provided link she has found on a web page, the call is routed in real-time to a charity payment service that charges her with a donation before the call is forwarded to the TV studio where she can talk with one of the TV show hosts. This can be accomplished in real-time, according to exemplary embodiments, by leveraging the addressing mechanisms supported by SOAP using SIP as bearer. For example, by adding a SOAPAction header to a SIP message, a SIP user-agent server (UAS) can be identified as the ultimate receiver of the SOAP envelope in the SIP payload. Additionally, a WSDL Interface can be used to describe the semantics of a web service being requested in order for corresponding tools to autogenerate client stubs for using the service. Note in this regard, WSDL 2.0 has migrated to "Interfaces" from "PortTypes" in WSDL 1.0, however, either can be used as examples of mechanisms which point to specific services, i.e., Web Services, and can be used in a SIP/SOAP binding. See, for example, the document WSDL 2.0, Section 2.2 incorporated by reference above. Similarly, "methods" provided in SOAPAction headers according to these exemplary embodiments provide an indicator of the type of service being requested where a Web Service could provide a number of different service variants. In this way information associated with a service's location, identification and/or input parameters is provided in the SIP message in a manner which is specific enough to connect the user to a particular service instance or Interface. Some detailed examples now follow.

Starting first with the SIP/SOAP message itself, various examples of a SIP message carrying one or more SOAP data elements as payload according to exemplary embodiments are presented below. A SOAPAction header is provided within the SIP content to enable the receiving SIP endpoint to determine whether to forward the embedded SOAP envelope for further processing, e.g., if the recipient node supports the Web Service identified in the SOAPAction header. The SOAPAction header provided in the SIP transport binding for SOAP according to these exemplary embodiments uses the URI syntax generically as follows:

SOAPAction: "URI"

A more specific example of a SOAPAction header according to these exemplary embodiments includes a uniform resource name (URN). As will be appreciated by those skilled in the art, a URN is a URI that identifies a resource by name in a particular namespace. In the context of these exemplary embodiments, the URN syntax can be provided to a SOAPAction header as follows:

SOAPAction: "urn:<NID>:<NSS>", where NID is a namespace identifier following, for example, the syntax for NIDs described in URN Syntax, RFC 2141, R. Moats, IETF 1997, and NSS has the following syntax:

NSS: "<Interface>!<methodName>"

The SOAPAction header URI indicates the ultimate receiver of the SOAP message embedded in the SIP message which is carrying it according to these exemplary embodiments. By adding a SOAPAction header to a SIP message, an Interface and method can be addressed by using the namespace specific part of the URN. This enables SIP proxies, and other nodes on the routing path of a particular message, to process the message correctly. The SOAP body references the method provided by the addressed Interface. This method is denoted in the SOAPAction header immediately after the delimiter which, in this exemplary embodiment, is an exclamation mark. Those skilled in the art will, however, appreciate that any unreserved character or character without other meaning can be used as a delimiter between the Interface and method in SOAPAction headers according to other exemplary embodiments.

Consider below another example of a SOAPAction header along with a SOAP body which can be used in SIP/SOAP messages according to these exemplary embodiments.

```
SOAPAction: "urn:stockservice-ericsson-
com:QuoteBean!GetLastTradePrice"
<soap:Body>
    <m:GetLastTradePrice xmlns:m="urn:stockservice-ericsson-com">
    </m:GetLastTradePrice >
</soap:Body>
```

In this example, the Interface QuoteBean is referenced in the SOAPAction header. The method provided by QuoteBean is called GetLastTradePrice. This method is referenced in the SOAPAction header after the exclamation mark. The SOAP body may contain more details relating to the specified method including parameters. For example, consider the more detailed example below. Therein, the Web Service being accessed by the SOAP payload provides stock quotes. More specifically, this particular SOAP message requests the last quote for the current price of Ericsson stock from an Interface called "QuoteBean". This code snippet enables Alice to request a stock quote which she will receive from the UAS that represents Bob, who might be a stock broker. The quote will be returned in, for example, the 200 OK message from Bob as a SOAP envelope. Alternatively, a SIP proxy on the route between Alice's device and Bob's device could provide the quote to Alice, in which case the SIP proxy node would then have been addressed in the SOAPAction header.

```
INVITE sip:bob@ericsson.com SIP/2.0
    Via: SIP/2.0/UDP pc33.atlanta.com;branch=z9hG4bKnashds8
    Max-Forwards: 70
    To: Bob <sip:bob@biloxi.com>
    From: Alice <sip:alice@atlanta.com>;tag=1928301774
    Call-ID: a84b4c76e66710
    CSeq: 314159 INVITE
    Contact: <sip:alice@pc33.atlanta.com>
    Content-Type: text/xml; charset=utf-8
    SOAPAction:
    "urn:stockservice-ericsson-com:QuoteBean!GetLastTradePrice"
    <?xml version="1.0"?>
    <soap:Envelope
        xmlns:soap="http://schemas.xmlsoap.org/soap/envelope/"
soa:encodingStyle="http://schemas.xmlsoap.org/soap/encoding/">
        <soap:Body>
            <m:GetLastTradePrice
            xmlns:m="urn:stockservice-ericsson-com">
                <symbol>ERIC B</symbol>
            </m:GetLastTradePrice>
        </soap:Body>
    </soap:Envelope>
```

Note therein again that a SOAPAction header is added to the list of standard SIP headers and bolded in the foregoing example. The SOAPAction header contains a uniform resource identifier (URI) that identifies a Web service that optionally can be described as a WSDL Interface (QuoteBean) and method name (GetLastTradePrice), thereby providing a mechanism according to these exemplary embodiments for precisely identifying a requested service. Additionally, in this example, the parameter "ERIC B" is provided in the SOAP Envelope to more completely specify the service being requested, i.e., to provide the current stock price of Ericsson stock having the symbol ERIC B. It will be appreciated, however, that some service requests may require more parameters (or no parameters) to fully specify the desired service and, as such, a SIP/SOAP message according to these exemplary embodiments may contain as many parameters as needed.

Having illustrated some code snippets of an exemplary SIP/SOAP combination, and an exemplary SOAP syntax for implementing a SIP transport binding of an embedded SOAP message, some higher level implementations which employ such messages to invoke real-time composition of services according to these exemplary embodiments will now be discussed. FIG. 1(a) illustrates one way in which an application or device according to these exemplary embodiments uses a SOAP client to construct a SOAP envelope in order to invoke a web service method while initiating a SIP session between an originating node 100 and a recipient node 110. Therein, the client application 200 uses an application programming interface (API) to create a SOAP message using a SOAP client 202, e.g., a SOAP Envelope having a SOAP body with, optionally, additional parameters indicative of the service to be requested. The SOAP message, examples of which are provided above, is then passed as all or part of the payload in a SIP message generated by SIP user-agent client (UAC) 204, for example, a SIP INVITE message, along with a SOAPAction header. The SIP UAC 204 can use client stubs generated by WSDL Interface syntax to create the SOAPAction header and envelope. It will be appreciated, however, that SIP messages other than SIP INVITE may also be used to carry the SOAP payload according to these exemplary embodiments, e.g., SIP OPTIONS or MESSAGE, if session initiation is not required for the particular service request.

The SIP UAC 204 sends the message over, for example, a user datagram protocol (UDP)/IP or transmission control protocol (TCP)/IP link (wireline or wireless) to the ultimate destination which is indicated by the SOAPAction header provided as part of the SIP payload. There may, of course, be intervening nodes (not illustrated in FIG. 2(a)), e.g., SIP proxies. The ultimate destination (recipient node 110) contains a SIP user-agent server (UAS) 206 as well as a SOAP endpoint 208 which is able to parse and dispatch the SOAP message to the corresponding Web Service indicated in the SOAPAction header carried as the SIP payload, e.g., one of the Web Services 210 or 212, via a service specific API. The SOAPAction header is processed by the SIP UAS 206 to determine whether the SOAP envelope payload should be passed on to the SOAP parser/dispatcher 208. Note in this regard that the ultimate receiver of the SIP message may differ from, or be the same as, the ultimate receiver of the SOAP envelope carried therein. In, for example, the above-described case where Alice calls a charity telethon TV show, the routing of the SOAP envelope toward a charity payment service that charges her with a donation can be performed by a SIP proxy node which is disposed between Alice's user device and the application server associated with handling the call to the TV show host. Thus, in this latter case, when the intervening SIP proxy node receives the SIP/SOAP message, its analysis of the SOAPAction header will inform it that the SOAP envelope should be processed locally and its parser/dispatcher 208 will extract the SOAP envelope and pass it on to a Web Service 210, 212 that handles payment. Then the SIP message will be forwarded onto its ultimate destination, e.g., a VoIP application server (not shown in Figure 1(a)).

Figure 1B:
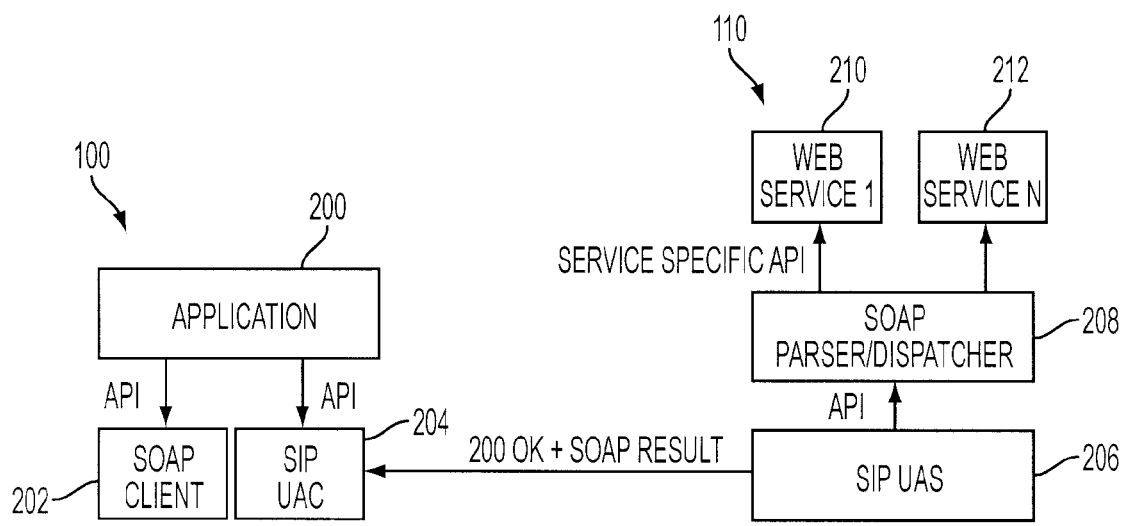
FIG. 1(b) shows acknowledgement of the SIP message including the SOAP payload according to an exemplary embodiment.

The UAS 206 can, for example, be preconfigured to include a list of currently deployed Web Services 210, 212 within the recipient node 110 to assist with the processing of the SOAPAction header. Typically, the response to the SOAP message will then be provided in the payload of a SIP 200 OK message, as shown in FIG. 1(b), which is returned to the client from the SIP UAS 230.

A Web Service provided by Web Services 210 and 212 can be defined, for example, as a software system designed to support interoperable machine to machine interactions over a network. In some implementations, Web Services can be provided as Web APIs accessible via a network (such as the Internet) and executed on a remote system hosting the requested services. However, in the exemplary embodiments illustrated above with respect to FIGS. 1(a) and 1(b), the Web Services 210 and 212 are part of a recipient node which includes the SOAP parser/dispatcher 208 and SIP UAS 206. Similarly, elements 200, 202 and 204 are part of an originator node associated with the SOAP/SIP message being transmitted. Thus, assuming that a match is found by SIP UAS 230 in processing the SOAPAction header, a corresponding one of the Web Services 210, 212 will provide the service requested via the SOAP Envelope to the recipient node 110. It will also be appreciated that a given recipient node 110 may have more or fewer than two Web Services integrated therewith.

The SOAPAction header, which provides the Interface and the method indications, and SOAP Envelope can be provided by themselves within a SIP message, as illustrated above, or with other content. For example, by using Multipurpose Internet Mail Extensions (MIME) multipart, a SIP message can contain a Session Description Protocol (SDP), or other content, as payload in addition to the embedded SOAP information. An example of this type of multipart SIP message according to an exemplary embodiment is provided below.

```
INVITE sip:bob@biloxi.com SIP/2.0
   Via: SIP/2.0/UDP pc33.atlanta.com;branch=z9hG4bKnashds8
   To: Bob <sip:bob@biloxi.com>
   From: Alice <sip:alice@atlanta.com>;tag=1928301774
   Call-ID: a84b4c76e66710
   CSeq: 314159 INVITE
   Max-Forwards: 70
   Date: Thu, 21 Feb 2002 13:02:03 GMT
   Contact: <sip:alice@pc33.atlanta.com>
   Content-Type: multipart/mixed;boundary=boundary42
   Content-Length: 568
   --boundary42
   Content-Type: message/sip
   INVITE sip:bob@biloxi.com SIP/2.0
   ...
   Content-Type: application/sdp
   Content-Length: 147
   v=0
   o=UserA 2890844526 2890844526 IN IP4 here.com
   s=Session SDP
   c=IN IP4 pc33.atlanta.com
   t=0 0
   m=audio 49172 RTP/AVP 0
   a=rtpmap:0 PCMU/8000
   --boundary42
   Content-Type: text/xml
       SOAPAction:
       "urn:stockquote-biloxi-com:QuoteBean!GetLastTradePrice"
       <?xml version="1.0"?>
       <soap:Envelope
       ...
```

Therein, it will be seen that the Content-Type headers defined in MIME multipart provide a structure by which a SIP message may contain payloads in addition to the SOAPAction header, and optionally SOAP Envelope body, according to these exemplary embodiments.

Figure 2:
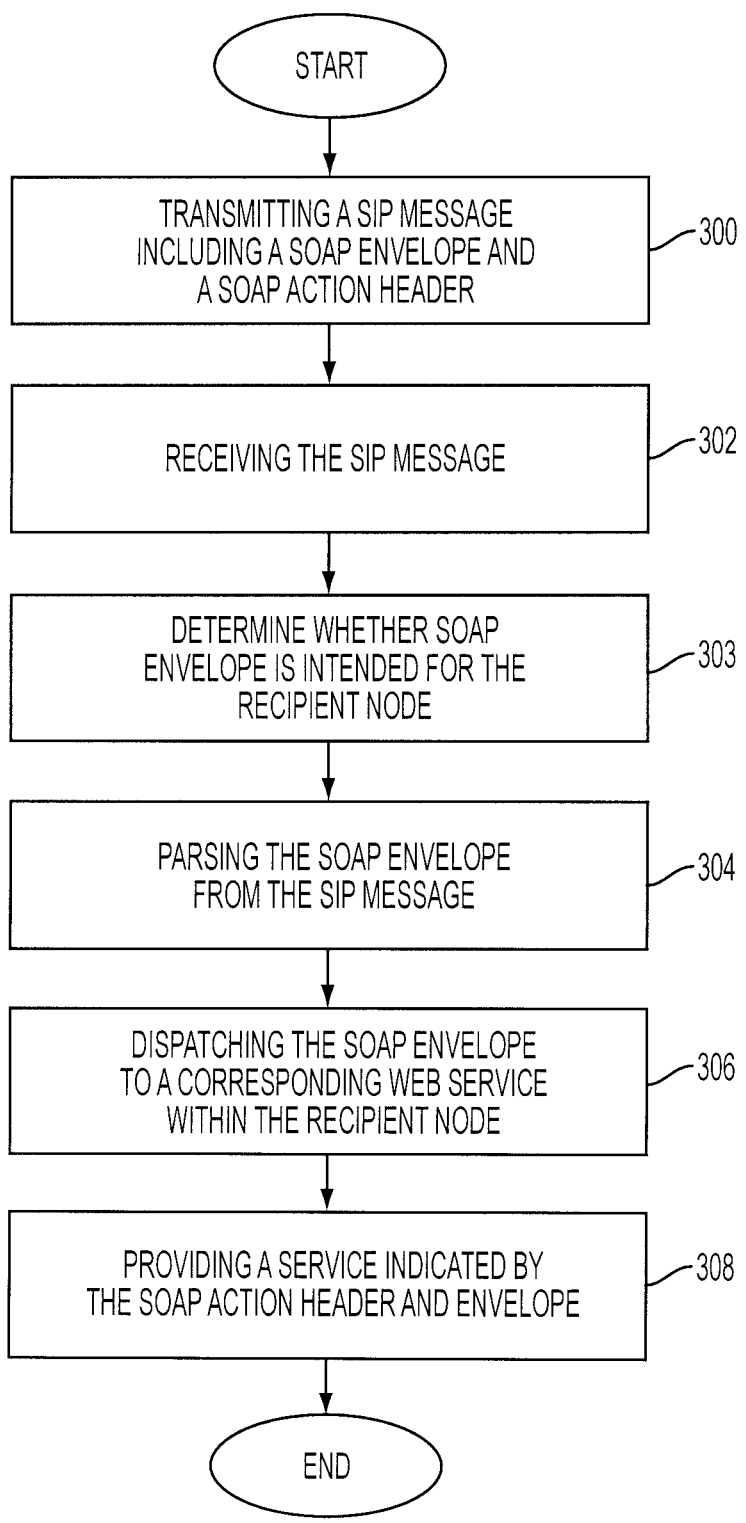
FIG. 2 is a flowchart illustrating a method according to an exemplary embodiment.
Figure 3:
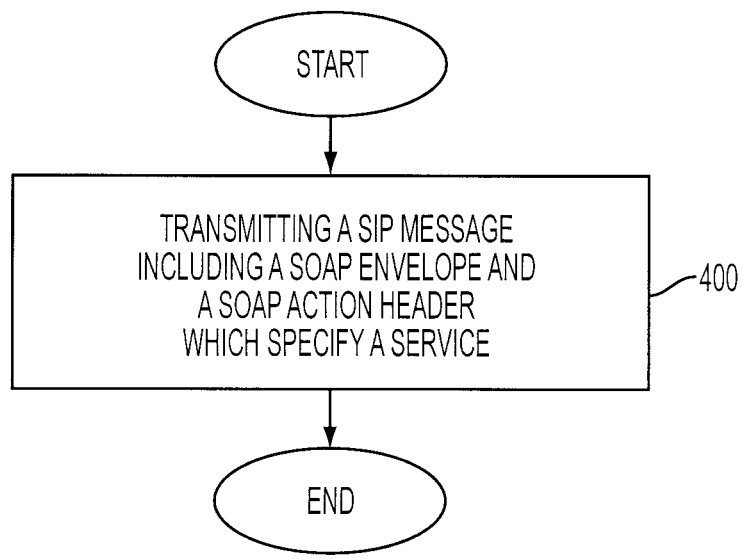
FIG. 3 is another flowchart illustrating another method according to another exemplary embodiment.

Based upon the foregoing description, it will be appreciated that various methods, e.g., for communicating, are presented by these exemplary embodiments. One such method is illustrated in the flowchart of FIG. 2. Therein, a SIP message including a SOAP envelope and a SOAP action header is transmitted at step 300. The SIP message is received at step 302 and the SOAPAction header is evaluated at step 303 to determine whether the SOAP Envelope is intended for that particular, recipient node. If so, the SIP/SOAP message is parsed to remove the SOAP envelope from the SIP message (step 304). The SOAP envelope may then be passed on to a corresponding Web Service at step 306. Then the service indicated by the SOAP Envelope and SOAPAction header can be provided to the recipient of the SIP message at step 308. Of course, given the fundamental nature of these exemplary embodiments, the exemplary method illustrated in FIG. 2 can be further generalized as, for example, illustrated in FIG. 3. Therein, at step 400, a Session Initiation Protocol (SIP) message including a Simple Object Access Protocol (SOAP) envelope and a SOAP action header which identify a service are transmitted, i.e., a Session Initiation Protocol (SIP) transport binding for SOAP messages.

Thus it will be apparent that, by combining Web Services (SOAP, WSDL and UDDI) and SIP, these exemplary embodiments enable, for example, an application developer to have access to a wide range of Internet services that can be interwoven during the session set up phase of SIP. Furthermore, SIP service composition can shorten the time to market for new, innovative end user services as well as open up business to business interaction over SIP by providing a facility for the real-time composition of services. Some examples of applications of these techniques were provided above. Many others are contemplated herein. For example, in the context of integrating presence notification and multimedia session setup, consider the following. As Alice makes the call to Bob she also chooses to indicate that her presence should be set to busy for all her watchers. As the session is being set up, the application server in Alice's home domain notifies the presence agent that her activity status is Busy, i.e., by virtue of a SOAP Action header and/or other SOAP data elements passed along with the SIP session setup message to the application server. Then, all watchers on Alice's presence list will now see Alice's presence status change for the duration of the call.

The afore-described, and other, exemplary systems and methods for communicating can be implemented by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above to send or receive SIP/SOAP messages. In alternative embodiments, hard-wire circuitry may be used in place of or in combination with software instructions to implement these exemplary embodiments.

It will be further appreciated that such embodiments can take various physical forms and may be used in, for example, various consumer electronic goods including (but not limited to) smart phones, personal digital assistants (PDAs), laptop computers, and the like. Generally speaking, a communication device which transmits or receives SIP/SOAP messages as described above may include the elements of the generic communication device illustrated in FIG. 4. Therein, a communication device 500 can include a processor 502 (or multiple processor cores), memory 504, optionally, one or more secondary storage devices 506, an operating system 508 running on the processor 502 and using the memory 504, as well as a one or more corresponding application(s) 510. An interface unit 512 may be provided to facilitate communications between the device 500 and the rest of a network or other peer-to-peer devices, or may be integrated into the processor 502. A wireless transceiver (not shown) could be included as part of the interface unit 512 if the device 500 is communicating over an air interface.

Service Intermediaries

The foregoing examples depict, among other things, the exchange of SIP/SOAP messages between endpoints to provide real time composition of services. However, a SIP/SOAP message can also travel across a number of intermediaries. In SIP this concept can be realized by, for example, sending a SOAP message through SIP servers or SIP terminals supporting SOAP. Intermediaries can be identified by the SOAP role header attribute. The role URI in the SOAP envelope, part of the SIP message payload, identifies a PortType (or Interface as mentioned above) which will act as an intermediary node which will process the header. The syntax associated with such an intermediary processing node can, for example, be described as follows:

soap:role="urn:application:PortType!method"

The subsequent SOAP header name should then correspond to the !method set forth in the role, with the header value being (at least one of) the parameter(s) to the method.

To provide some context as an aid to understanding the role of intermediaries and intermediary addressing according to these exemplary embodiments, consider the following service scenario. Suppose that Alice, a stock broker, calls her client, Bob to discuss a purchase. As she initiates the call session, e.g., a VoIP call, she also chooses to include two services that will provide data to be presented to Bob at the beginning of the call. For example, these two services could be Bob's portfolio service and Alice's purchase candidate list with some history graphs and key figures. To accomplish this, the session initiation message which Alice sends to Bob includes service requests to Bob's Portfolio Service and to Alice's Candidate Service. As the message is intercepted by the respective services, data is collected and inserted into the body of the message. Finally the message reaches Bob who is presented with his portfolio contents and the list of purchase candidates. At the same time Bob hears Alice's greeting and the conversation begins. An exemplary SIP message carrying SOAP with headers to be processed by an intermediary node to implement this service scenario could, for example, be generated as follows:

```
INVITE sip:bob@biloxi.com SIP/2.0
Via: SIP/2.0/UDP pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Content-Type: text/xml; charset=utf-8
SOAPAction: "urn:chargingservice-atlanta-
com:ChargingService!addChargingRecord"
SOAPAction: "urn:stockservice-biloxi-
com:QuoteBean!GetLastTradePrice"
<?xml version="1.0"?>
<soap:Envelope
    xmlns:soap="http://schemas.xmlsoap.org/soap/envelope/"
soap:encodingStyle="http://schemas.xmlsoap.org/soap/encoding/">
    <soap:Header>
    <p:addChargingRecord
    xmlns:p="chargingservice.atlanta.com"
soap:role="urn:chargingservice-atlanta-
com:ChargingService!addChargingRecord">
        <p:chargingId>alice@atlanta.com</p:chargingId>
        <p:event>quoteRequest</p:event>
    </p:addChargingRecord>
    </soap:Header>
    <soap:Body>
    <m:GetLastTradePrice xmlns:m="stockservice.biloxi.com">
        <symbol>ERIC B</symbol>
    </m:GetLastTradePrice>
    </soap:Body>
</soap:Envelope>
```

In the foregoing code snippet example, the first bolded code line indicates a SOAP action header which is intended to be operated on by an intermediary node according to this exemplary embodiment. The SOAP header which corresponds to the service requested from this intermediary node and associated addressing toward the intermediary node (i.e., the soap:role parameter) are bolded further down within the same code snippet.

An exemplary embodiment of an intermediary node which can be used to perform processing of SIP/SOAP messages as described above is illustrated as FIG. 5. Therein, the intermediary node 600 operates on, e.g., a computing device such as that illustrated in FIG. 4, which is connected to an IP network. The intermediary node 600 includes, for example, a SIP proxy 602, a SOAP parser/dispatcher 604, and one or more Web services 604. The SIP proxy 602 is an entity which enables the intermediary node 600 to receive and proxy SIP messages. SIP proxy 602 can, among other things help route requests to a user's current location, authenticate and authorize users for services, implement provider call-routing policies, provide features to users and provide a registration function that allows users to upload their current locations for use by proxy servers.

Figure 4:
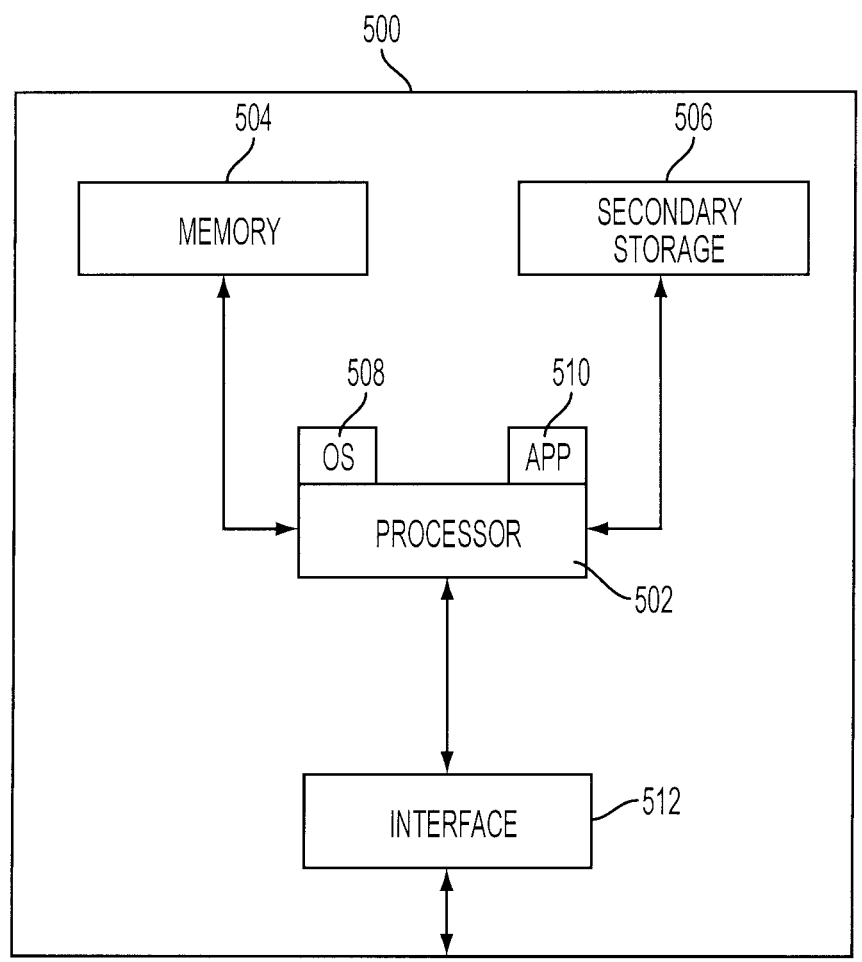
FIG. 4 depicts a communication device according to an exemplary embodiment.
Figure 5:
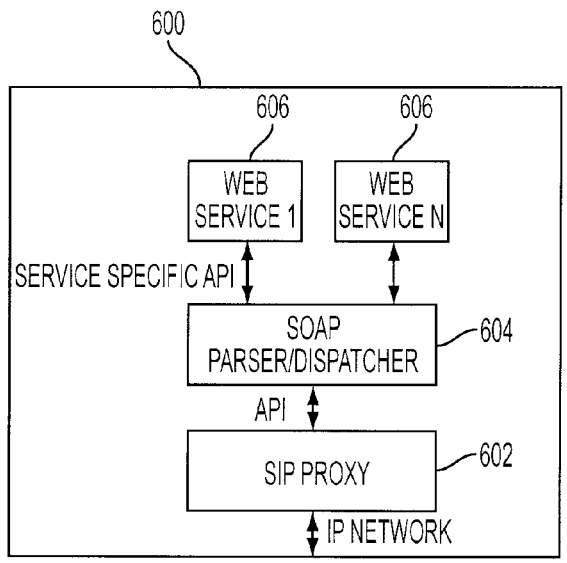
FIG. 5 illustrates an intermediary node according to an exemplary embodiment.

For example, the SIP proxy 602 can perform generally in accordance with the specifications for a proxy as specified in RFC 3261, the disclosure of which is incorporated here by reference. The proxy functionality of element 602 has the effect that the intermediary node 600 (containing the SIP proxy 602) will not terminate the routing of the session initiation, but rather process the SOAP envelope, append the result to the payload (hence modifying the original contents of the SIP message) and forward to the destination indicated in the SIP Request URI. The proxy may also add itself to the subsequent SIP messaging by using Record-route as specified in RFC 3261. One difference between an intermediary node, including a SIP proxy, and an endpoint according to these exemplary embodiments is that the endpoint will terminate the session routing. Hence no additional piggy-backing of network based data can be added to the SIP message once it reaches an endpoint. The SIP intermediary node 600, including SIP proxy 602, can, for example, be implemented as a server, e.g., as shown in FIG. 4, but may also be implemented as logically separate "nodes" on the same physical node or server.

The SOAP parser 604 parses SOAP headers which are inside a SOAP envelope carried by the SIP messages. Also deployed on the intermediary 600, is a SOAP Dispatcher 602 which is able to invoke Web Services 606 associated with the SOAP headers which are addressed to the intermediary node 600, e.g., addressed using a SOAPAction header and SOAP header with role parameter as illustrated in the foregoing code snippet. These, and other, features of intermediary nodes 600 will be better understood in the context of the end-to-end messaging example which will now be described with respect to FIGS. 6 and 7.

Figure 6:
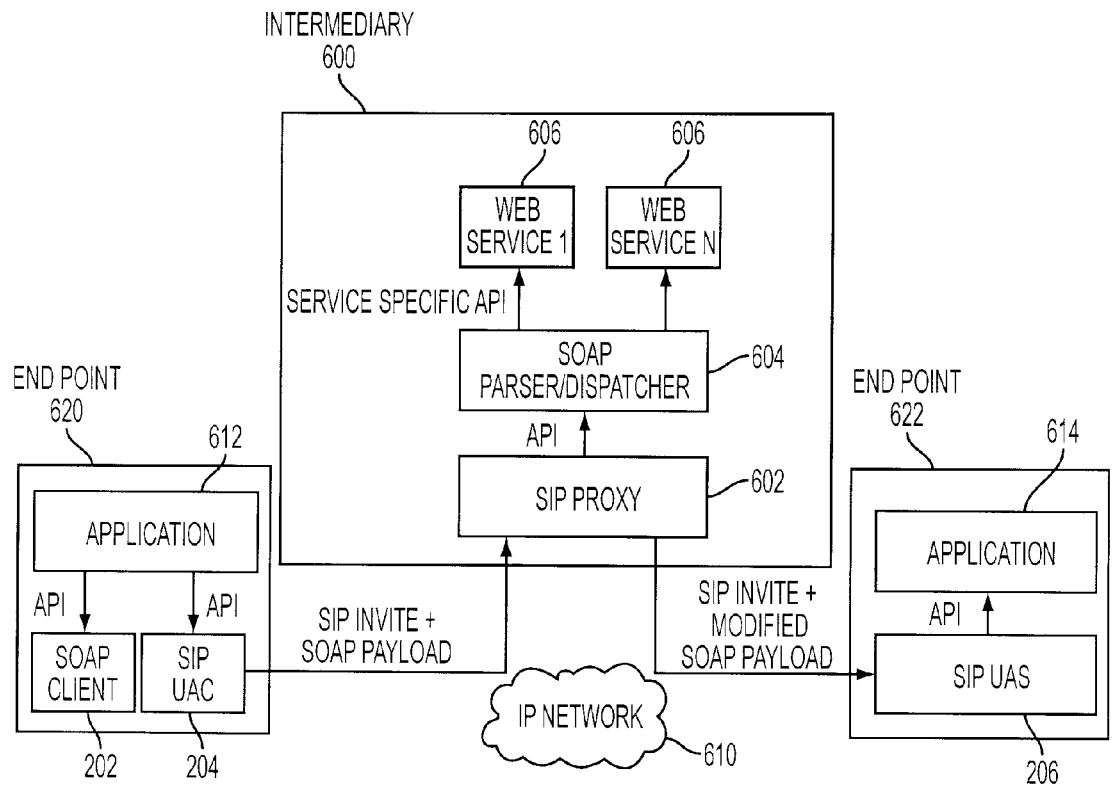
FIG. 6 illustrates a system including an intermediary node according to an exemplary embodiment.
Figure 7:
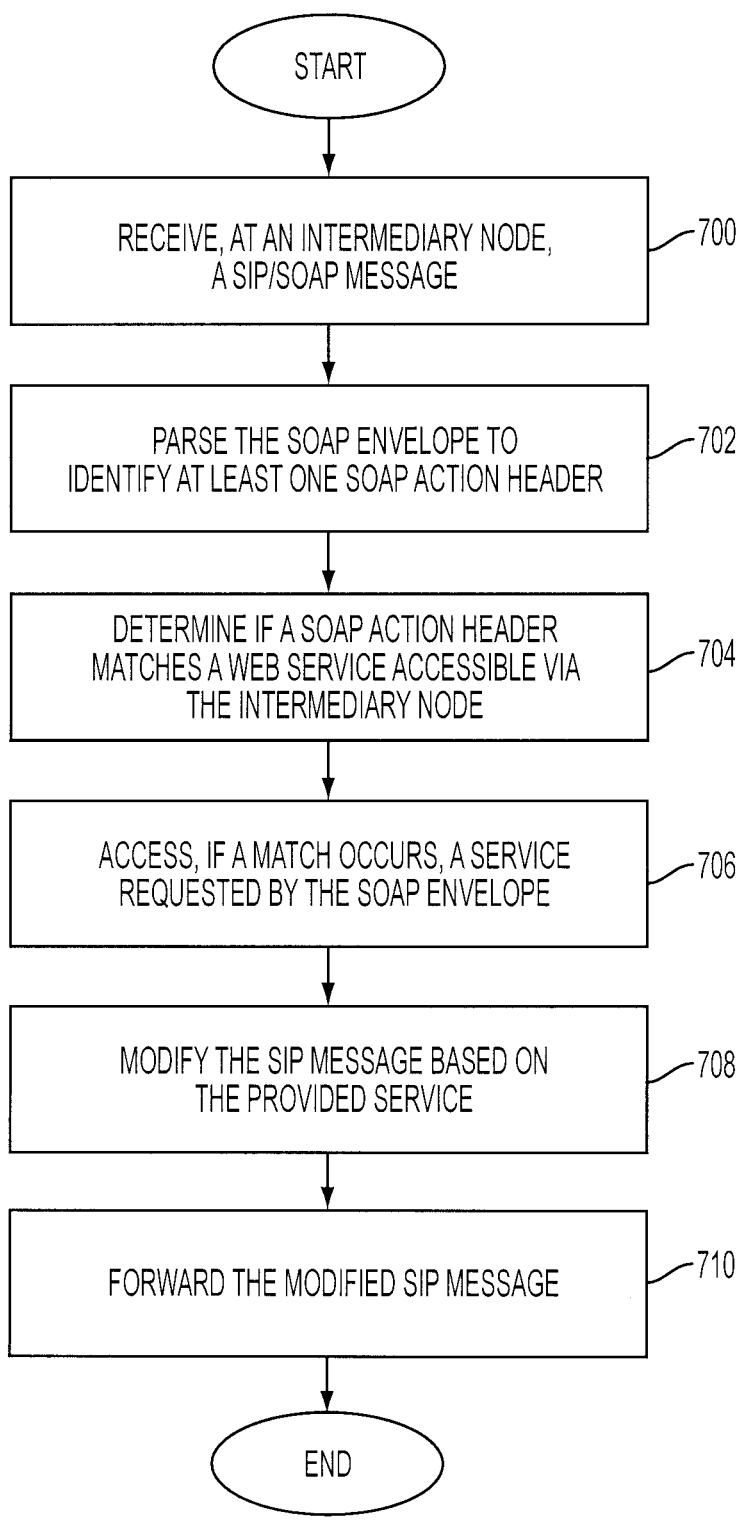
FIG. 7 is a flowchart illustrating a method according to an exemplary embodiment.

FIG. 6 illustrates one exemplary manner in which two SIP endpoints can be connected to one another via a SIP Proxy or intermediary node 600 which node also includes a SOAP intermediary. FIG. 7 is a flowchart illustrating an exemplary method associated therewith. Therein, a first endpoint 620, e.g., Alice's node, is running an application 612 which creates a SOAP envelope containing a header which references an intermediary node 600 that is located on a SIP Proxy 602 along the route to the B-party, i.e., in this example the called party (Bob) using equipment designated as endpoint 622. Alice's client application 612 uses the SIP UAC 204 to send a SIP message containing the SOAP envelope as payload data, e.g., over an IP network 610. When receiving a SIP message (step 700), the SIP Proxy 602 may initially scan the SIP message in order to detect whether the SIP message includes a SOAP envelope.

If the SIP Proxy 602 does not detect a SOAP envelope or payload within the SIP message, and assuming that the SIP message is itself not addressed thereto, then the intermediary node 600 will forward the SIP message onward, e.g., toward another intermediary (or the final destination). If, on the other hand, the SIP Proxy 602 detects a SOAP payload within the SIP message, then the SIP Proxy 602 invokes an API towards a SOAP Parser/Dispatcher 604. The SOAP Parser/Dispatcher 604 receives the SOAP envelope originally contained in the SIP message payload through the API called by the SIP Proxy 602 and parses the SOAP envelope looking for SOAP headers (step 702). Thus, according to one exemplary embodiment, the SIP Proxy 602 strips out the SOAP envelope from the SIP/SOAP message and passes only the SOAP envelope along to the SOAP Parser/Dispatcher 604 for further processing. Thus, using the foregoing code snippet as an example, SIP Proxy 602 could strip out the following code and pass same to the SOAP Parser/Dispatcher 604:

```
<soap:Envelope
    xmlns:soap="http://schemas.xmlsoap.org/soap/envelope/"
soap:encodingStyle="http://schemas.xmlsoap.org/soap/encoding/">
    <soap:Header>
        <p:addChargingRecord xmlns:p="chargingservice.atlanta.com"
soap:role="urn:chargingservice-atlanta-
com:ChargingService!addChargingRecord">
            <p:chargingId>alice@atlanta.com</p:chargingId>
            <p:event>quoteRequest</p:event>
        </p:addChargingRecord>
    </soap:Header>
    <soap:Body>
  <m:GetLastTradePrice xmlns:m="stockservice.biloxi.com">
      <symbol>ERIC B</symbol>
  </m:GetLastTradePrice>
</soap:Body>
</soap:Envelope>
```

If a SOAP header found by the SOAP Parser/Dispatcher 604 matches a deployed Web Service 606 associated with this particular intermediary node 600 (step 704), then the SOAP Dispatcher 604 uses a service specific API to invoke the corresponding method in the deployed Web Service 606 (step 706). One exemplary difference between code portions within a SIP/SOAP message which are directed toward an intermediary node 600, as compared to those directed an endpoint 622, is the role parameter located in the SOAP header, which also contains input parameters to the method provided by the PortType/Interface. The endpoint 622, on the other hand, is only concerned with processing the actual SOAP body (as opposed to the SOAP header) in the SIP/SOAP message. By providing multiple SOAPAction headers paired with multiple SOAP headers containing a matching role parameter, it is possible to chain processing from multiple intermediaries along the route between endpoints to provide services accessible by each. Thus, again using the exemplary code snippet described above, the SOAP Parser/Dispatcher 604 could pass on the following portion of the SIP/SOAP message received by intermediary node 600 toward the corresponding Web Service 606 via its API:

```
<soap:Header>
    <p:addChargingRecord xmlns:p="chargingservice.atlanta.com"
soap:role="urn:chargingservice-atlanta-
com:ChargingService!addChargingRecord">
        <p:chargingId>alice@atlanta.com</p:chargingId>
        <p:event>quoteRequest</p:event>
    </p:addChargingRecord>
</soap:Header>
```

After processing of the service request provided within the SOAP envelope is complete, the Web Service 606 may forward the result to the next SIP node on the route. The result can be sent by, for example, modifying the original SIP message received by the intermediary node 600 (step 708), e.g., by appending a result received from the Web Service 606 to the payload of the original SIP message. It will be appreciated, however, that in certain cases intermediary processing of the SOAP method indicated in the SOAP header does not return a result. In such cases there is no need to append a result to the SIP message payload.

The SIP Proxy 602 proxies the SIP message with a modified payload if the original SOAP envelope in the received SIP/SOAP message contained a SOAP action header matching a Web Service accessible via this particular intermediary node 600, further along its route to the final destination. When the SIP message reaches its original destination, the processing at the endpoint 622 can proceed as described above with respect to FIGS. 1-4. It will be appreciated that, although only a single intermediary node 600 is illustrated in the exemplary embodiment of FIG. 6, a typical implementation may include a plurality of intermediary nodes 600 disposed along the route between endpoints, some or all of which may have access to different Web Services and which will operate on a received SIP/SOAP message as described above. Moreover, the receiving UAS 206 at a message endpoint 622 will also have the capability to scan for multiple SOAP envelopes within the received SIP/SOAP message, which envelopes contain results from intermediaries passed along the way.

Service Discovery Using UDDI

Figure 8:
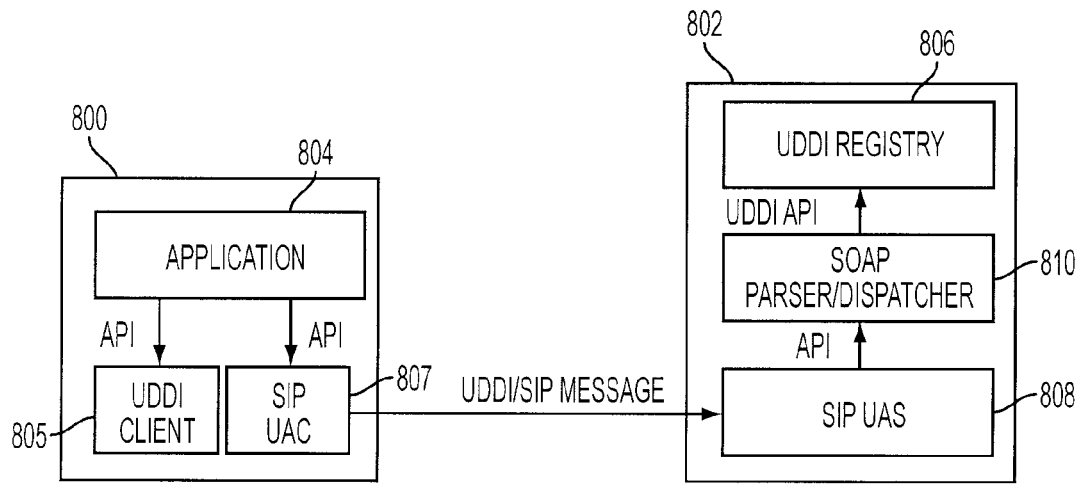
FIGS. 8 and 9 illustrate service discovery between endpoints according to an exemplary embodiment.

In order to provide dynamic service composition, according to these exemplary embodiments, there is also provided the ability for clients and applications to discover existing services. More specifically, exemplary embodiments provide methods, systems, devices and software for discovering such services using UDDI with SIP as transport. By using UDDI API requests as a payload in a SIP message according to these exemplary embodiments, a UDDI registry can, for example, reside on a SIP Server on a mobile device supporting SOAP over SIP. A user can send SIP messages to the registry containing UDDI inquiries for services. The UDDI Inquiry API provides, for example, the find_service method which is used to discover services that match provided criteria for a particular business entity. The categoryBag argument, for example, contains properties that describe the capability of the service. To illustrate these techniques for service discovery, FIG. 8 provides an exemplary embodiment showing two endpoints 800 and 802 containing an application 804 and a UDDI registry 806, respectively.

Therein, the so-called A-party's device 800 (i.e., the calling party) includes an application 804 that is used to initiate a session, e.g., a SIP session, to the B-party 802 (i.e., the called party). The application 804 uses a UDDI client 805 which creates a UDDI find_service request. The UDDI find_service request is passed to the SIP UAC 807 which embeds the UDDI request within a SOAP envelope in the SIP INVITE payload before sending the request to the B-party's endpoint 802. For example, the application 804 can call the UDDI client 805 in order to create a SOAP envelope containing the find_service request. The SOAP envelope is returned to the application 804 which then passes the envelope on to the SIP UAC 807 which, in turn, will construct the SIP INVITE message and append the SOAP envelope as payload data.

The B-party's device 802 contains a SIP UAS 808 that receives the SIP INVITE message including the UDDI request and parses the payload. If a SOAP envelope is found in the received SIP message, then that SOAP envelope is passed to a SOAP Parser/Dispatcher 810 through an API. The SOAP Parser/Dispatcher 810 parses the UDDI find_service request from within the SOAP envelope and invokes its dispatcher (illustrated as part of the SOAP Parser 810, but which can be implemented as a separate entity). The dispatcher portion of SOAP Parser/Dispatcher 810 invokes the UDDI registry 806 located on the B-party's device via an associated API, which results in a list of services, e.g., Web Services as described above, being returned to the SOAP Parser/Dispatcher 810.

Figure 9:
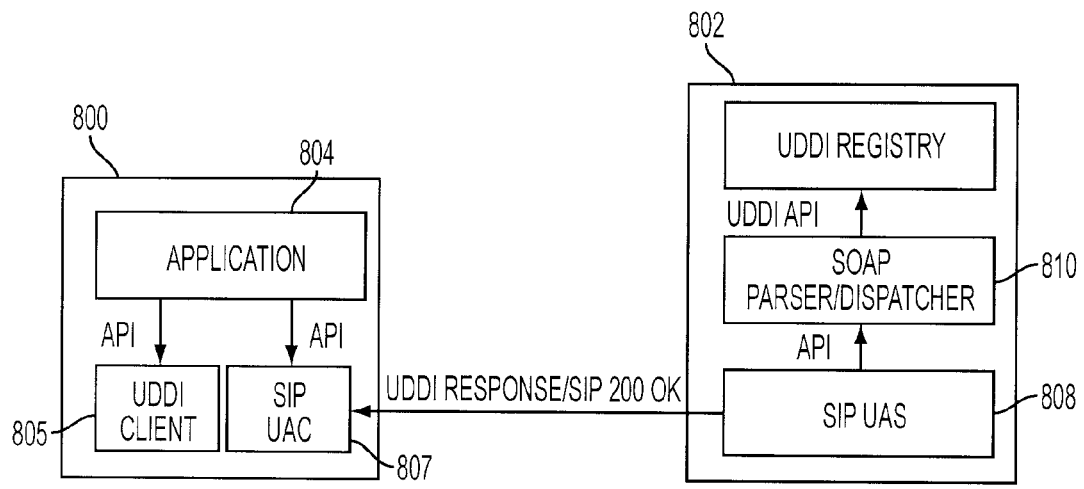

When the UDDI registry 806 on the B-party's device or endpoint 802 returns the message, the SOAP Parser/Dispatcher 810 embeds the returned ServiceList in a SOAP envelope. The SOAP envelope is then passed to the SIP UAS 808 which, in turn, places the SOAP envelope in the payload of the SIP 200 OK response. This latter messaging event is illustrated in FIG. 9, wherein the same reference numerals are used to represent the same or similar elements as shown and described above with respect to FIG. 8.

A more detailed example will provide further insight into these exemplary embodiments related to service discovery. Consider the following code snippet example associated with an exemplary scenario wherein Alice sends a SIP INVITE message from her device/endpoint 802 which includes a UDDI find_service request to query Bob's endpoint 802 and corresponding UDDI registry 806 regarding which services are available/accessible via Bob's endpoint 802.

```
INVITE sip:bob@biloxi.com SIP/2.0
Via: SIP/2.0/UDP pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Content-Type: text/xml; charset=utf-8
SOAPAction: "urn:bob-biloxi-
com:UDDI_inquiry_api!find_service"
<?xml version="1.0" encoding="utf-8"?>
  <soap:Envelope
      xmlns:xsi=http://www.w3.org/2001/XMLSchema-instance
      xmlns:xsd=http://www.w3.org/2001/XMLSchema
      xmlns:soap=
         "http://schemas.xmlsoap.org/soap/envelope/">
    <soap:Body>
      <find_service businessKey="Key1"
          generic="2.0"
          maxRows="15"
          xmlns="urn:uddi-org:api_v2">
        <findQualifiers>
          <findQualifier />
          <findQualifier />
        </findQualifiers>
        <name ="" />
        <name ="" />
        <categoryBag>
          <keyedReference tModelKey="tModelKey1"
            keyName="tModelKey1Name"
            keyValue="tModelKey1Value" />
          <keyedReference tModelKey="tModelKey2"
            keyName="tModelKey2Name"
            keyValue="tModelKey2Value" />
        </categoryBag>
        <tModelBag>
          <tModelKey>tModelKey3</tModelKey>
          <tModelKey>tModelKey4</tModelKey>
        </tModelBag>
      </find_service>
    </soap:Body>
  </soap:Envelope>
```

Therein, the bolded code line is a SOAP Action header which indicates the inclusion of a UDDI find_service request embedded in the SIP/SOAP message being transmitted from endpoint 800 to endpoint 802. The corresponding code response from Bob's endpoint 802 could, for example, appear as follows.

```
SIP/2.0 200 OK
Via: SIP/2.0/UDP server10.biloxi.com;branch=z9hG4bK4b43c2ff8.1
;received=192.0.2.3
Via: SIP/2.0/UDP
bigbox3.site3.atlanta.com;branch=z9hG4bK77ef4c2312983.1
;received=192.0.2.2
Via: SIP/2.0/UDP pc33.atlanta.com;branch=z9hG4bKnashds8
;received=192.0.2.1
To: Bob <sip:bob@biloxi.com>;tag=a6c85cf
From: Alice <sip:alice@atlanta.com>;tag=1928301774
```

```
Call-ID: a84b4c76e66710
CSeq: 314159 INVITE
Contact: <sip:bob@192.0.2.4>
Content-Type: text/xml; charset=utf-8
Content-Length: 131
<?xml version="1.0" encoding="utf-8"?>
<soap:Envelope
    xmlns:xsi=http://www.w3.org/2001/XMLSchema-instance
    xmlns:xsd=http://www.w3.org/2001/XMLSchema
    xmlns:soap=
        "http://schemas.xmlsoap.org/soap/envelope/">
    <soap:Body>
        <serviceList generic="2.0"
            operator="MyCompany"
            truncated="false"
            xmlns="urn:uddi-org:api_v2">
            <serviceInfos>
                <serviceInfo serviceKey="ServiceKey1"
                    businessKey="Key1">
                    <name =""/>
                    <name =""/>
                </serviceInfo>
                <serviceInfo serviceKey="ServiceKey2"
                    businessKey="Key2">
                    <name =""/>
                    <name =""/>
                </serviceInfo>
            </serviceInfos>
        </serviceList>
    </soap:Body>
</soap:Envelope>
```

Figure 10:
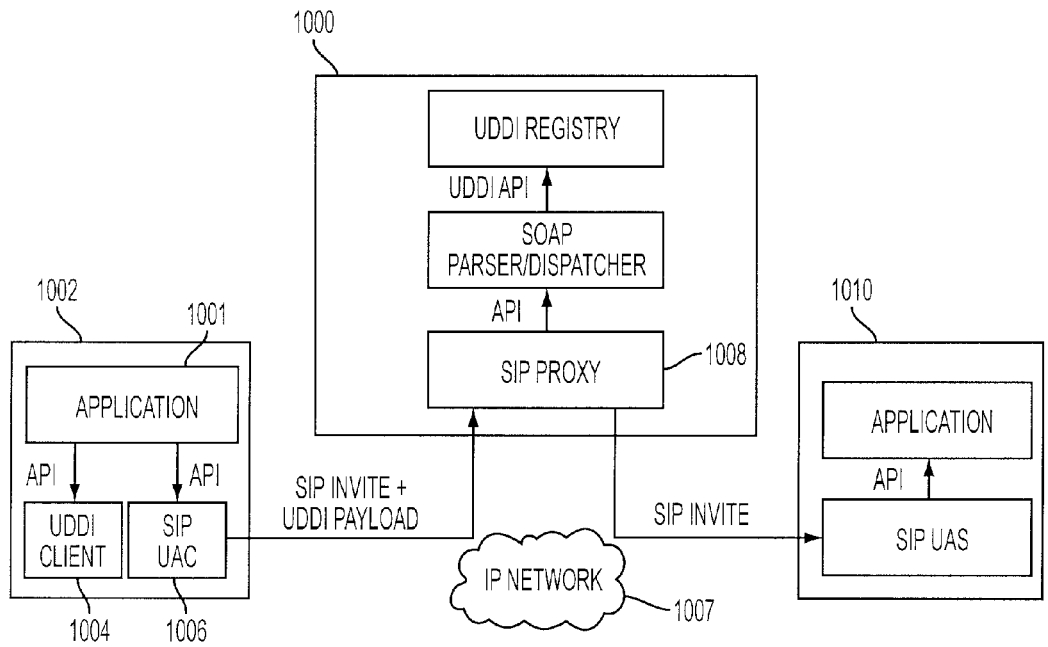
FIGS. 10 and 11 illustrate service discovery associated with an intermediate node according to an exemplary embodiment.

A UDDI registry 806 can also be located in an intermediary node as opposed to an endpoint as described above and illustrated in FIGS. 8 and 9. In such exemplary embodiments, the UDDI find_services request and corresponding response can be embedded within, for example, the SIP INVITE and SIP 200 OK messages being sent between the endpoints, e.g., the A-party and the B-party. FIG. 10 shows an intermediary node 1000 containing a UDDI registry. Therein, an application 1001, e.g., an operating system associate with a mobile device, associated with an endpoint 1002 uses a UDDI client 1004 to create a UDDI find_service request. The UDDI find_service request is embedded in a SOAP envelope and placed in the payload of a SIP INVITE message sent by the SIP UAC 1006 via an IP network 1007. The SIP message is intercepted by a SIP Proxy 1008 which is part of the intermediary node 1000 located along the route between the SIP endpoints 1002 and 1010. The SIP Proxy 1008 detects the SOAP envelope in the payload and sends it to the SOAP Parser/Dispatcher 1012. The SOAP Parser/Dispatcher 1012, parses out and invokes the UDDI find_service method toward the UDDI registry 1014. The UDDI registry 1014 returns its service list, e.g., a list of Web Services which are available via other APIs from the intermediary node 1000 and the resulting service list is stored, e.g., in the SOAP Parser/Dispatcher 1012. The SIP Proxy 1008 adds itself to the SIP signaling path by adding a Record-route header to the original SIP message, which modified version of the SIP message is then proxied to the original destination, in this example endpoint 1010.

In order to address a service discovery request to an intermediary UDDI registry 1014 according to these exemplary embodiments, a SOAP header can be provided within the SOAP envelope in a manner which is similar to that described above for addressing intermediary nodes 600. However, an additional parameter can be added to the SOAP header which informs the SOAP Parser/Dispatcher 1012 associated with the addressed intermediary node 1000 to store the ServiceList and to associate the stored ServiceList with the current SIP dialogue. For example, consider the following code snippet wherein a SOAPAction header is paired with a SOAP header in the envelope (shown below) to achieve this addressing to an intermediary node of a service discovery request:

```
<soap:Header>
    <p:find_service xmlns:p="sip-proxy.atlanta.com"
soap:role="urn:sip-proxy-atlanta-com:UDDI_inquiry_api!find_service">
        <p:SOAPResult>callback</p:SOAPResult>
    </p:find_service>
</soap:Header>
```

Note in the foregoing code, the parameter "SOAPResult" having the value "callback". This is one exemplary mechanism by which the SOAP Parser/Dispatchers 1012 will recognize that they are to operate in the manner described above and can be added to the service discovery request by the UDDI client 1004. For example, when seeing this parameter in a SOAP header, the SOAP Parser/Dispatcher 1012 will automatically store the result from the web service indicated by the soap:role and generate a callback (e.g., function pointer or object reference) that will be passed to the SIP Proxy 1008. The callback has a generic method that is being called by the SIP Proxy 1008 when a response to the dialog associated with the callback is received. The callback is implemented by the SOAP Parser/Dispatcher 1012 which inserts the stored result from the web service in the payload of the SIP message.

Additionally, a parameter in the SOAP action header is provided that tells the SIP Proxy 1008 to Record-route itself, i.e., place itself on the return path of the dialog. The added parameter to the SOAPAction header can, for example, be implemented as shown below:

```
SOAPAction: "urn:sip-proxy-atlanta-
    com:UDDI_inquiry_api!find_service";record-route
```

Note the record-route parameter appended to the SOAPAction header. The presence of a record-route parameter in a SOAPAction header will request that an intermediary node 1000 matching the urn referred to in the SOAPAction header value will add a record-route header to the SIP message forwarded to the destination indicated by the SIP URI. The record-route parameter can be added to the SOAP Action header by, for example, the SIP UAC 1006 of the node which creates the service discovery request.

Figure 11:
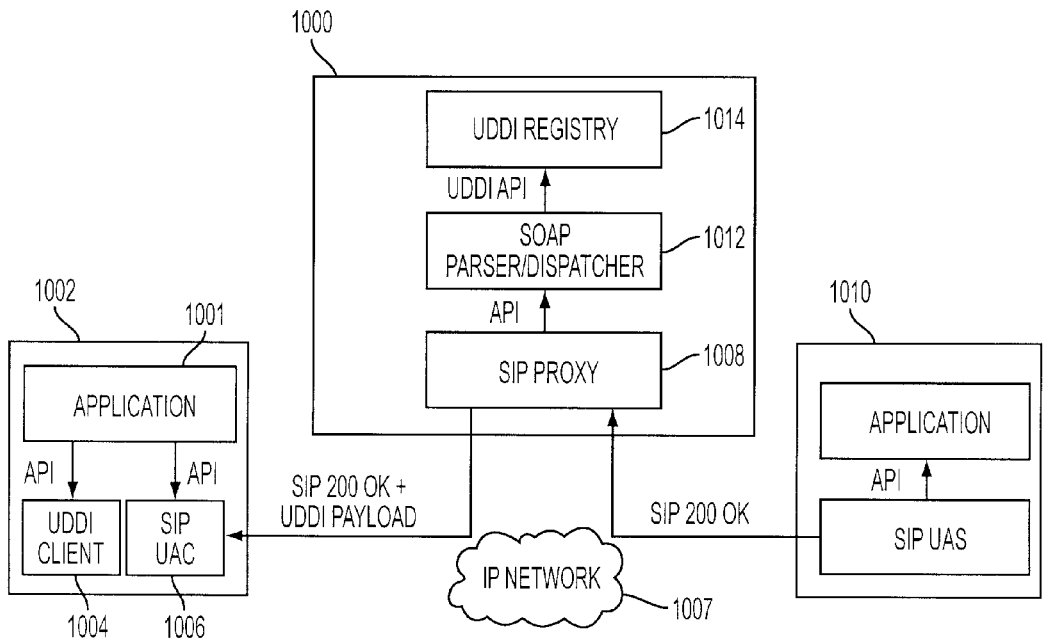

When the SIP 200 OK response is returned from the B-party's endpoint 1010, as shown in FIG. 11, it passes through the SIP Proxy 1008 due to the Record-route header which was added to the original SIP/SOAP message. The SIP Proxy 1008 uses the previously stored callback (e.g., function-pointer or object-reference) to invoke the SOAP Parser/Dispatcher 1012 that kept the result from the previous find_service invocation. The SOAP Parser/Dispatcher 1012 inserts the UDDI ServiceList into a SOAP envelope which is placed in the SIP 200 OK payload.

Figure 12:
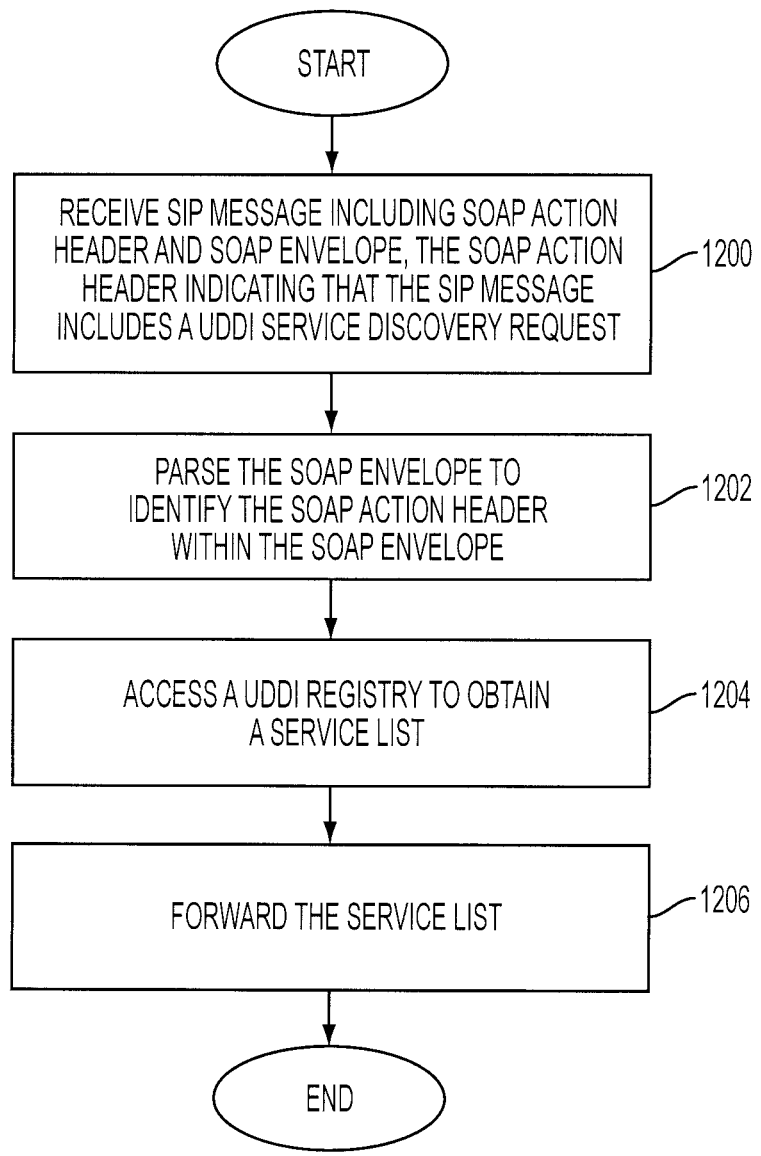
FIG. 12 is a flowchart illustrating a method for service discovery according to an exemplary embodiment.

Thus, a method for service discovery according to an exemplary embodiment can include the steps illustrated in the flowchart of FIG. 12. Therein, at step 1200, a Session Initiation Protocol (SIP) message including a Simple Object Access Protocol (SOAP) envelope and a SOAP action header is received, the SOAP action header indicating that the SIP message includes a Universal Description, Discovery and Integration (UDDI) service discovery request. The SOAP envelope is parsed to identify the SOAP action header within the SOAP envelope, e.g., which indicates that a service discovery request is being made to the recipient node, at step 1202. In response thereto, a UDDI registry is accessed to obtain a service list at step 1204. The service list is forwarded at step 1206, e.g., either directly or indirectly as described above.

By combining SIP with UDDI service discovery according to these exemplary embodiments becomes tightly connected to real time communication session initiation. This means that sessions can be renegotiated depending on available services of the called party or by some intermediary along the route. Additionally, the combination of SIP and UDDI services can be added to session initiation, either by the called party's own device or by a service intermediary along the route. This opens up a wide range of possibilities for combining services and real time communication to provide a richer user experience and an increase in the number of possible service and communication scenarios.

Service Subscription Using UDDI

By using UDDI API requests as payload in a SIP message, a UDDI registry can reside on a SIP Server located on a mobile device supporting SOAP over SIP as described above. To provide another mechanism for accessing such services, according to these exemplary embodiments, a user can send SIP SUBSCRIBE messages containing UDDI save_subscription requests to the UDDI registry. The UDDI Subscription API provides the save_subscription method which can be used, according to these exemplary embodiments, to subscribe to notifications for new services. In this context, an Event Service acts as an intermediary node between a watcher and the provider of the UDDI registry. An example of service subscription according to exemplary embodiments will be described below with respect to FIG. 13.

Figure 13:
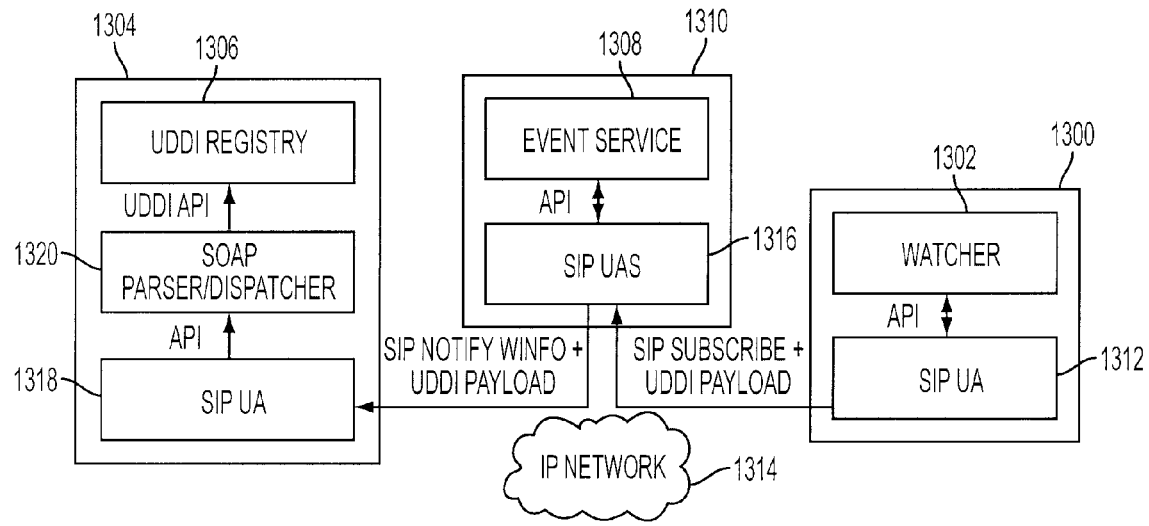
FIGS. 13 and 14 illustrate service subscription according to an exemplary embodiment.

Therein, FIG. 13 shows a first endpoint 1300, including a watcher function 1302, a second endpoint 1304, which is running a UDDI registry 1306, and an intermediary node 1310 with an Event Service 1308 operating thereon, The Event Service 1308 can, for example, be implemented as software running on a server as intermediary node 1310, e.g., a server as shown in FIG. 4, in the network using a storage mechanism for active subscriptions, e.g. a database or a filesystem. The watcher 1302 sets up a subscription by sending a SIP SUBSCRIBE message with a service event package. Service event packages according to these exemplary embodiments are described in more detail below. The SIP SUBSCRIBE message according to this exemplary embodiment contains a UDDI save_subscription as payload. By using UDDI as payload in a SIP SUBSCRIBE message, a UDDI registry 1306 can be subscribed to for new services. The UDDI Subscription API provides the save_subscription method which is used to subscribe for services that matches provided criteria. These criteria can, for example, be implemented as a subscription filter as specified in the above-incorporated by reference UDDI specifications.

These exemplary embodiments involve two related processes: techniques for setting up service subscriptions and, subsequently, techniques for notifying subscribers of services. Taking, first of all, techniques for setting up subscriptions according to exemplary embodiments, consider the following example relative to FIG. 13 wherein Alice, using endpoint device 1300, wants to subscribe to services provided by Bob, who is operating endpoint device 1304. In this example, the watcher 1302, i.e., Alice, at endpoint 1300 sends a SIP SUBSCRIBE message via SIP user agent 1312 which requests a subscription to Bob's services using, for example, the service event package with a UDDI save_binding request in the payload to the Event Service 1308 at intermediary node 1310. The UDDI save_binding request contains a SIP URI which Bob's UDDI registry will use to send subscription notifications as described below with respect to FIG. 14. In the same SIP message payload, Alice's endpoint device 1300 also includes a UDDI save_subscription request to register a subscription on Bob's UDDI registry in order to be notified when new services become available. An example of the SIP SUBSCRIBE message with its UDDI payload according to this exemplary embodiment is provided below.

```
SUBSCRIBE sip:bob@biloxi.com SIP/2.0
Via: SIP/2.0/UDP pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 SUBSCRIBE
Contact: <sip:alice@pc33.atlanta.com>
Content-Type: text/xml; charset=utf-8
Event: service
Expires: 600
SOAPAction: "urn:bob-biloxi-
com:UDDI_subscription_api!save_binding!save_subscription"
<?xml version="1.0" encoding="utf-8"?>
  <soap:Envelope
    xmlns:xsi=http://www.w3.org/2001/XMLSchema-instance
    xmlns:xsd=http://www.w3.org/2001/XMLSchema
    xmlns:soap=
      "http://schemas.xmlsoap.org/soap/envelope/">
    <soap:Body>
<save_binding xmlns="urn:uddi-org:api_v3">
            <authInfo>myAuthCode</authInfo>
            <bindingTemplate bindingKey=""
            serviceKey="uddi:myservicekey">
            <description>notify_subscriptionListener binding for
  my subscription.
            </description>
            <accessPoint URLType="sip">
            sip:alice@pc33.atlanta.com ;SOAPAction=urn:alice-atlanta-
com :services!notify_subscriptionListener
            </accessPoint>
            <tModelInstanceDetails>
            <tModelInstanceInfo
            tModelKey="uddi:uddi.org:v3_subscriptionlistener" />
            </tModelInstanceDetails>
            </bindingTemplate>
</save_binding>
```

Note, in the foregoing code example, the SOAPAction header which includes both a save_binding request and a save$_{13}$ subscription request. This exemplary SIP/SOAP message can be transmitted by the SIP UA 1312 over, e.g., IP network 1314. The Event Service 1308 in intermediary node 1310 receives this message via its own SIP UAS 1316, e.g., it is routed to the Event Service 1308 using outbound proxy settings in the subscriber's device 1300. The Event Service 1308 uses the information in the SOAPAction header to create a NOTIFY message using the service.winfo event package. The NOTIFY message created by the Event Service 1308 will contain the save_binding request and the save_subscription request, which were forwarded to it by Alice's endpoint device 1300. That is, when receiving a SUBSCRIBE message from Alice's endpoint device 1300, the Event Service 1308 stores the subscription parameters and forwards the save_subscription portion to Bob's device 1304 using the contents of the SOAPAction header for routing. For example, the NOTIFY message sent to Bob's endpoint device 1304 via SIP UAS 1316 and IP network 1314 can contain a save_subscription request generated by the watcher application 1302 of Alice's endpoint device 1300 as follows:

```xml
<save_subscription xmlns="urn:uddi-org:sub_v3">
  <authInfo>myAuthCode</authInfo>
  <subscriptions>
    <subscription brief="true">
      <subscriptionFilter>
        <find_service xmlns="urn:uddi-org:api_v3" >
          <findQualifiers>
            <findQualifier>
              uddi:uddi.org:findqualifier:sql99:like
            </findQualifier>
          </findQualifiers>
          <categoryBag>
            <keyedReference
              tModeKey="uddi:uddi.org:ubr:taxonomy:naics"
              keyName="Motor Vehicle Parts"
              keyValue="42112_"/>
          </categoryBag>
        </find_service>
      </subscriptionFilter>
      <bindingKey>
        bindingKeyOfTheClientsNotifySubscriptionListenerService
      </bindingKey>
      <notificationInterval>P5D</notificationInterval>
      <maxEntities>1000</maxEntities>
    </subscription>
  </subscriptions>
</save_subscription>
</soap:Body>
</soap:Envelope>
```

The NOTIFY message is received by Bob's endpoint device 1304 and processed by its SIP UA 1318 and SOAP Parser/Dispatcher 1320 to disassemble the SIP/SOAP message and pass the subscription request on to its UDDI Registry 1306. In this way, when Bob adds a new service and registers that service with the local UDDI service in his device 1304, the UDDI registry 1306 will automatically send a PUBLISH message toward Alice's device 1300. The PUBLISH message contains a notify_subscriber UDDI request with information about the service to the Event Service 1308, as described in more detail below. The save_subscription code portion of the code can be used to indicate to Bob those people or devices who are subscribing to his services. This allows him to set up, for example, black lists or special promotion messages directed toward his service subscribers. As an initial acknowledgement, SIP UA 1318 sends a SIP 200 OK message toward Alice's endpoint device 1300 which contains a subscription structure as an initial response to Alice's save_subscription request, e.g., using the type of structure described in the UDDI VE specification at section 5.5.8, as found at http://www.uddi.org/pubs/uddi-v3.00-published-20020719.htm, the disclosure of which is incorporated here by reference.

Figure 14:
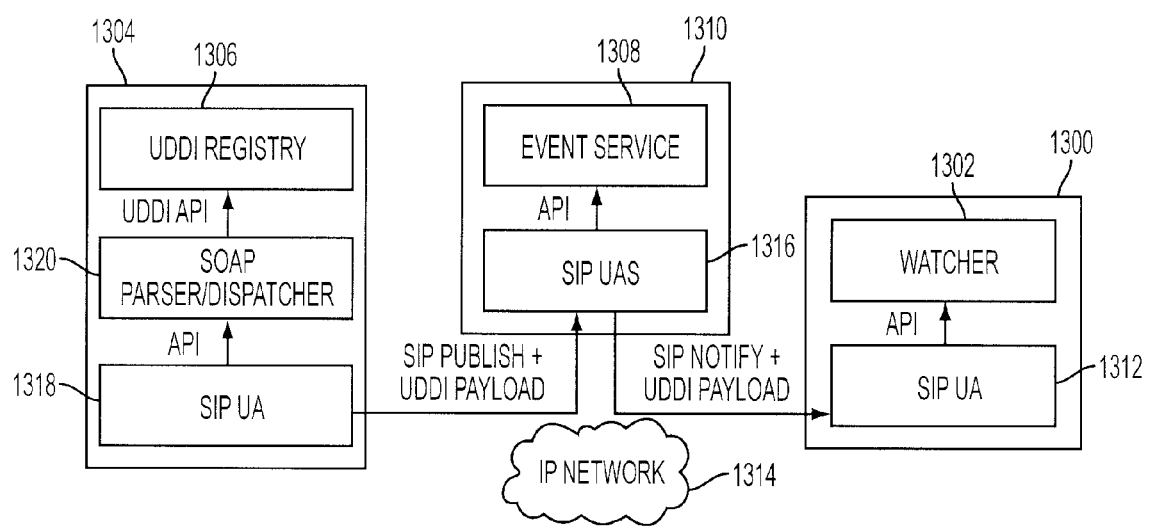

Having established a subscription with Bob's endpoint device 1304 using SIP/SOAP messaging with UDDI payloads as described above, another aspect of these exemplary embodiments, involves subsequent notification toward Alice's endpoint of new services which Bob's endpoint device 1304 is able to provide. More specifically, Bob's endpoint device 1304 will, subsequently to establishment of the subscription, send SIP PUBLISH messages toward Alice's endpoint 1300 which contain information regarding new services. An example of this message flow according to one exemplary embodiment is illustrated in FIG. 14. For example, such information can be contained in invocations of the notify_subscriptionListener method which can be provided as a web service by the watcher (Alice in this example). The PUBLISH message(s) are received by intermediary node 1310 which, in turn, sends notifications to all of the subscriber's of Bob's services, e.g., including Alice's endpoint device 1300. To provide notification of a new service offered by Bob's device, an invocation is carried in the payload of a corresponding NOTIFY message, which is sent from the Event Service 1308 to Alice's endpoint device 1300. An example of such a NOTIFY message is provided below:

```
NOTIFY sip:alice@atlanta.com SIP/2.0
Via: SIP/2.0/UDP bobs-pc.biloxi.com;branch=z9hG4bKnashds8
Max-Forwards: 70
To: Alice <sip:alice@atlanta.com>
From: Bob <sip:bob@biloxi.com>;tag=1928301774
Call-ID: a84b4c76e66710
CSeq: 314159 SUBSCRIBE
Contact: <sip:alice@pc33.atlanta.com>
Content-Type: text/xml; charset=utf-8
Event: service
Subscription-State: active;expires: 599
SOAPAction: "urn:alice-atlanta-
com:services!notify_subscriptionListener"
<?xml version="1.0" encoding="utf-8"?>
  <soap:Envelope
    xmlns:xsi=http://www.w3.org/2001/XMLSchema-instance
    xmlns:xsd=http://www.w3.org/2001/XMLSchema
    xmlns:soap=
        "http://schemas.xmlsoap.org/soap/envelope/">
    <soap:Body>
<notify_subscriptionListener>
  <subscriptionResultsList>
    <coveragePeriod>
      <startPoint>20020727T00:00:00
      </startPoint>
      <endPoint>20020728T00:00:00</endPoint>
    </coveragePeriod>
    <subscriptionbrief="true">
      <subscriptionFilter>
        <find_servicexmlns=
            "urn:uddi-org:api_v3" >
          <categoryBag>
            <keyedReference
              tModeKey="uddi:ubr.uddi.org:
                taxonomy:unspsc"
              keyName="Beer"
              keyValue="50.20.20.02.00"/>
          </categoryBag>
        </find_service>
      </subscriptionFilter>
      <bindingKey>
        bindingKeyOfTheClients
        NotifySubscriptionListenerService
      </bindingKey>
      <notificationInterval>P1D
      </notificationInterval>
      <maxEntities>1000</maxEntities>
      <expiresAfter>20030101T00:00:00
      </expiresAfter>
    </subscription>
    <keyBag>
      <deleted>false</deleted>
        <serviceKey>uddi:BeerSupplies.com:
      maltSelectionService</serviceKey>
        <serviceKey>uddi:Containers.com:kegs:
      orderingService</serviceKey>
    ...
    </keyBag>
  </subscriptionResultsList>
</notify_subscriptionListener>
</soap: Body>
</soap: Envelope>
```

Note, in particular, the bolded SOAP action header in the above code snippet, which contains information taken from the access point in the save_binding request. In this regard, an access point is the URI to which the notify_subscriptionListener request is to be sent, e.g., it is a local web service PortType (interface) running in Alice's device 1300. For example, the above-described described code snippet which includes the SUBSCRIBE request from Alice's device 1300 contains the following code:

```
<accessPoint URLType="sip">
    sip:alice@pc33.atlanta.com ;SOAPAction=urn:alice-atlanta-
com :services!notify_subscriptionListener
        </accessPoint>
```

This URN is copied into the SOAPAction header in the NOTIFY message sent by the Event Service 1308 to Alice's device 1300 as a response to the previous PUBLISH message sent from Bob's device 1304 to the Event Service 1308.

As described above, service subscription capabilities can be provided to SIP/SOAP messaging techniques for real-time services. One exemplary mechanism for providing this functionality is to add an explicit service event package to the event packages which are provided for in SIP's event notification framework, i.e., to add a service event package to the event packages described in Session Initiation Protocol (SIP)—Specific Event Notification, RFC 3265, A. Roach, IETF 2002, the disclosure of which is incorporated here by reference. According to one exemplary embodiment, this new service event package can be defined as follows, although it will be appreciated by those skilled in the art that other definitions could be used for alternate implementations.

Event Package Name

The name of the event package is service. This name should be used as value of the Event header in SUBSCRIBE messages.

Example:
Event: service

Event Package Parameters

This package does not define any additional parameters to the event package.

SUBSCRIBE Bodies

The body of a SUBSCRIBE message containing the service event MUST contain a SOAP envelope with a UDDI save_binding and save_subscription request in the SOAP body.

Subscription Duration

The default expiration time for subscriptions within this package is 3600 seconds. As per the above incorporated by reference RFC 3265 document, the subscriber may specify an alternate expiration in the Expires header field.

NOTIFY Bodies

The body of a NOTIFY message containing the service event contains a SOAP envelope with a UDDI notify_subscriptionListener request in the SOAP body.

SOAPAction Header

The SUBSCRIBE, PUBLISH and NOTIFY messages also contain a SOAPAction header. The header uses the URI syntax, e.g., as defined in Uniform Resource Identifiers (URI): Generix Syntax, RFC 2396, T. Berners-Lee et al., IETF 1998, as follows:
SOAPAction: "URI"
For example, the URN syntax can be used as follows:
SOAPAction: "urn:<NID>:<NSS>"
where NID follows the syntax for Namespace Identifier in, e.g., URN Syntax, RFC 2141, R. Moats, IETF 1997;
And NSS has the following syntax:
NSS: "<PortType>!<methodName>"
The SOAPAction header URI indicates the ultimate receiver of the SOAP message. By adding SOAPAction header to a SIP message, a PortType (or interface) and method can be addressed by using the name space specific part of the URN. This enables SIP Proxies and other nodes on the route to process the message correctly. The SOAP body references the method provided by the addressed PortType (Interface). This method is denoted in the SOAPAction header immediately after the exclamation mark.

Figure 15A:
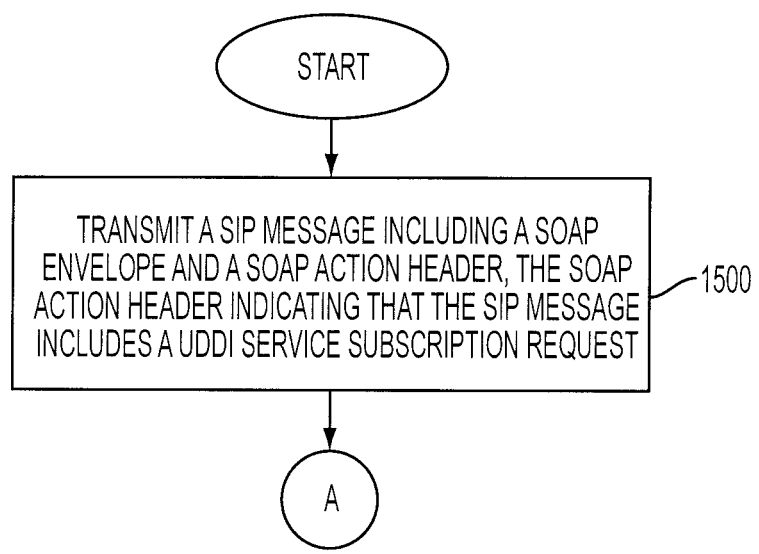
FIGS. 15(a)-15(c) are a flowchart illustrating various methods for service discovery according to exemplary embodiments.
Figure 15B:
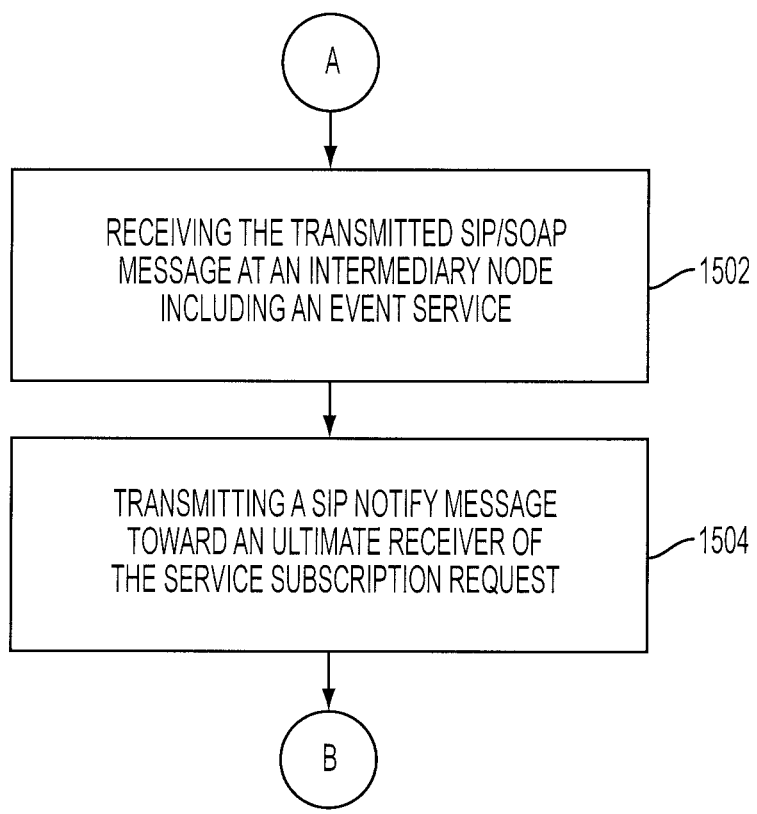
Figure 15C:
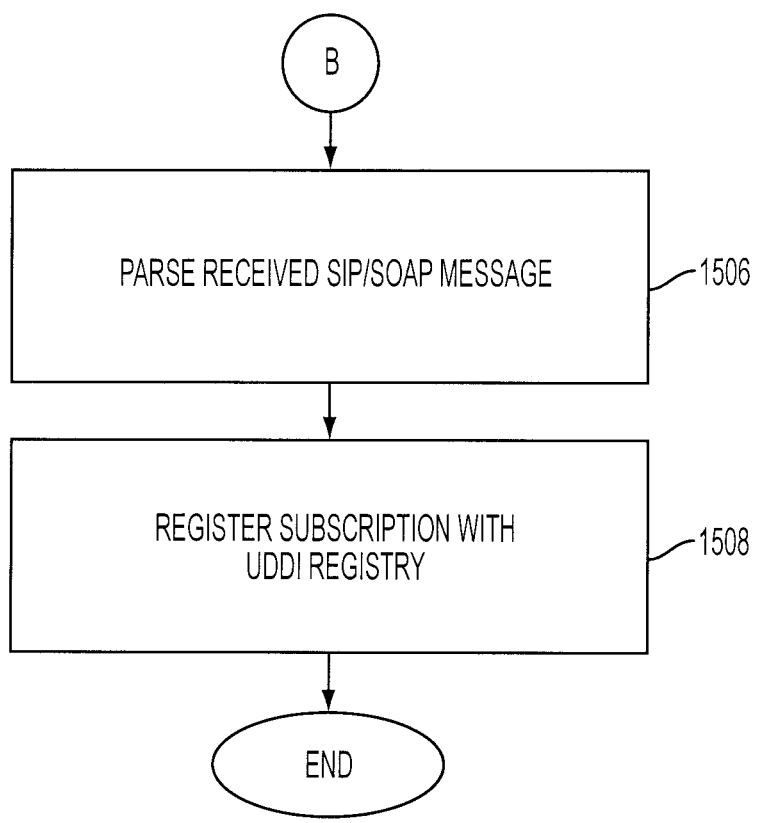

By combining Web Services (SOAP, WSDL and UDDI) and SIP the application developer obtains access to a wide range of Internet services that can be interwoven during the session set up phase of SIP. Real time service composition, including service discovery and service subscription, is facilitated using the afore-described exemplary embodiments. In particular, a method for service subscription can include the step illustrated in the flowchart of FIG. 15(*a*). Therein, at block 1500, a Session Initiation Protocol (SIP) message is transmitted including a Simple Object Access Protocol (SOAP) envelope and a SOAP action header, the SOAP action header indicating that the SIP message includes a Universal Description, Discovery and Integration (UDDI) service subscription request. This step can, by itself, comprise a method for service discovery according to an exemplary embodiment. Alternatively, the method can continue to include other steps associated with downstream processing of the SIP/SOAP message as shown in FIG. 15(*b*). Therein, the flowchart illustrates the step 1502 of receiving the transmitted SIP/SOAP message at an intermediary node including an Event Service, and transmitting a SIP NOTIFY message toward an ultimate receiver of the service subscription request at step 1504. Again, the method can continue on, from the intermediary node, toward the ultimate receiver as shown in FIG. 15(*c*). Therein, at step 1506, the recipient node parses the SIP/SOAP message and registers the subscription with the UDDI registry 1306.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A service subscription method comprising:
transmitting a Session Initiation Protocol (SIP) SUBSCRIBE message including a Simple Object Access Protocol (SOAP) envelope and a SOAP action header, said SOAP action header indicating said SIP message includes a Universal Description, Discovery and Integration (UDDI) service subscription request;
receiving said transmitted SIP/SOAP message at an intermediary node including an Event Service;
transmitting a SIP NOTIFY message toward an ultimate receiver of said service subscription request;
parsing the SIP/SOAP message;
registering the service subscription request with a UDDI registry; and
transmitting a SIP PUBLISH message subsequent to said SIP SUBSCRIBE message toward the ultimate receiver of said service subscription request, wherein said SIP PUBLISH message includes information regarding a new service.

2. The method of claim 1, wherein said SOAP envelope includes a UDDI save_binding request and save_subscription request in a SOAP body.

3. The method of claim 1, wherein said SOAP action header indicates an ultimate receiver of said SOAP envelope for which a service subscription is being requested.

4. The method of claim 1, wherein said SIP/SOAP message includes a SOAP envelope containing a UDDI notify_subscriptionListener request in a SOAP body.

\* \* \* \* \*